United States Patent
Tsukada

(10) Patent No.: US 10,218,878 B2
(45) Date of Patent: Feb. 26, 2019

(54) METHOD FOR CORRECTING DENSITY IRREGULARITY, PRINTING APPARATUS, AND IMAGING MODULE

(71) Applicant: Seiko Epson Corporation, Tokyo (JP)

(72) Inventor: Kazunari Tsukada, Shiojiri (JP)

(73) Assignee: Seiko Epson Corporation (JP)

( * ) Notice: Subject to any disclaimer, the term of this patent is extended or adjusted under 35 U.S.C. 154(b) by 72 days.

(21) Appl. No.: 15/251,311

(22) Filed: Aug. 30, 2016

(65) Prior Publication Data

US 2017/0064142 A1    Mar. 2, 2017

(30) Foreign Application Priority Data

Sep. 2, 2015   (JP) ................................ 2015-172699

(51) Int. Cl.
| | | |
|---|---|---|
| *H04N 1/40* | (2006.01) | |
| *H04N 1/00* | (2006.01) | |
| *H04N 1/401* | (2006.01) | |
| *H04N 1/407* | (2006.01) | |

(52) U.S. Cl.
CPC ..... *H04N 1/40068* (2013.01); *H04N 1/00015* (2013.01); *H04N 1/00251* (2013.01); *H04N 1/4015* (2013.01); *H04N 1/4078* (2013.01)

(58) Field of Classification Search
CPC ............. H04N 1/40068; H04N 1/4078; H04N 1/4015; H04N 1/00251; H04N 1/00015
See application file for complete search history.

(56) References Cited

U.S. PATENT DOCUMENTS

| | | | | |
|---|---|---|---|---|
| 6,970,270 | B1 * | 11/2005 | Ushiroda | ............. H04N 1/4015 358/1.9 |
| 7,667,867 | B2 * | 2/2010 | Goma | .................... G03B 27/72 358/1.4 |
| 2006/0232835 | A1 * | 10/2006 | Goma | .................... G03B 27/72 358/504 |
| 2006/0262361 | A1 | 11/2006 | Nakano et al. | |

FOREIGN PATENT DOCUMENTS

| | | | |
|---|---|---|---|
| JP | 2004167947 A | * | 6/2004 |
| JP | 2006-305956 A | | 11/2006 |

* cited by examiner

*Primary Examiner* — Kent Yip
(74) *Attorney, Agent, or Firm* — Harness, Dickey & Pierce, P.L.C.

(57) ABSTRACT

A printer performs a method for correcting density irregularity that includes: acquiring imaging data by imaging, using an imaging device mounted in a printer, a correcting pattern that is used to correct density irregularity, which contains a strip region (first pattern) with first density and a strip region (second pattern) with second density different from the first density; and correcting the density irregularity based on the imaging data.

12 Claims, 15 Drawing Sheets

METHOD FOR CORRECTING DENSITY IRREGULARITY, PRINTING APPARATUS, AND IMAGING MODULE

BACKGROUND

1. Technical Field

The present invention relates to a method for correcting density irregularity, a printing apparatus, and an imaging module.

2. Related Art

In a printing apparatus that ejects ink on a medium (for example, a paper surface) so as to print an image, band-like or streaky density irregularity (so-called banding) occurs in a main-scanning direction of a printing head that ejects ink, in some cases. By comparison, there is known a system that corrects such banding (for example, see JP-A-2006-305956).

In the system disclosed in JP-A-2006-305956, a medium (paper, cloth, a film, an OHP sheet, or the like), on which a correcting pattern is printed by a printing apparatus, is set in a scanner. The scanner has a line sensor and line scanning is performed by the line sensor such that the correcting pattern is read to acquire image data. Then, the read and acquired image data is transmitted to a computer from the scanner, and the computer acquires a correction value that is used to correct density irregularity, based on the image data.

Incidentally, in the system disclosed in JP-A-2006-305956, the medium, on which printing is performed by a printer, is reset in the scanner such that the scanner reads the correcting pattern through line scanning. In the reading of the image through the line scanning, a problem arises in that there is a limit to a reading speed and it takes a time to acquire the correction value (banding correction). In addition, in JP-A-2006-305956, since the medium, on which the printing apparatus has performed printing, need to be reset in the scanner, even in this respect, it takes a long time to perform the banding correction. Further, there is a shift between a position of the correcting pattern when the medium is set in the scanner and a position of the correcting pattern printed by the printer, and thus there is a possibility that there is a positional error even in a correction value.

SUMMARY

An advantage of some aspects of the invention is to provide a method for correcting density irregularity, in which it is possible to rapidly and accurately perform correction of density irregularity, a printing apparatus, and an imaging module.

According to an application example of the invention, there is provided a method for correcting density irregularity including: acquiring imaging data by imaging, by an imaging device mounted in a printing apparatus, a correcting pattern for correcting density irregularity, which contains a first pattern with first density and a second pattern with second density different from the first density; and correcting the density irregularity based on the imaging data.

In the application example, in the acquiring of the imaging data, the correcting pattern containing the first pattern and the second pattern is imaged using the imaging device mounted in the printing apparatus, and the density irregularity (banding) is corrected based on the imaging data in the correcting. In the method for correcting the density irregularity, it is possible to acquire the imaging data of the correcting pattern, with the medium (paper surface or the like), on which the correcting pattern is printed by the printing apparatus, set in the printing apparatus without translocation of the medium to a scanner or the like. In this case, in order to perform banding correction of the printing apparatus, the correcting pattern set in the printing apparatus is used, and thus it is possible to identify a correction position with accuracy, compared to a case where a medium, on which a correcting pattern is printed, is caused to move (be translocated) to the scanner. In other words, in a case where the correcting pattern is translocated to the scanner such that an image is acquired, a position coordinate system used to form the correcting pattern in the printing apparatus is different from a position coordinate system of an image scanned in the scanner. Thus, a positional error is likely to occur and it is not possible to acquire an accurate correction value for a correction position, in some cases. In this case, there is a need to perform a process of performing positional correction by which the position coordinate system in the printing apparatus matches the position coordinate system in the scanner, or the like, and thus, processes or operations become complicated. By comparison, in the application example, as described above, since the correcting pattern set in the printing apparatus is imaged by the imaging device, the position coordinate system used when the correcting pattern is formed and the position coordinate system used when the correcting pattern is imaged are the same, and thus it is possible to easily acquire an accurate correction value.

In addition, unlike the scanner that performs line scanning, since it is possible to acquire imaging data in a larger region by using the imaging device, it is possible to reduce time taken to acquire the imaging data of the correcting pattern containing the first pattern and the second pattern, and thus it is possible to achieve reduction in time taken in the banding correction.

It is preferable that, in the method for correcting the density irregularity of the application example, the acquiring of the imaging data includes acquiring first division data by imaging a first region of the correcting pattern, acquiring second division data by imaging a second region of the correcting pattern, and synthesizing the first division data and the second division data and acquiring the imaging data.

In the application example, the first region of the correcting pattern is imaged in the acquiring of the first division data so as to acquire the first division data, the second region of the correcting pattern is imaged in the acquiring of the second division data so as to acquire the second division data, and the first division data and the second division data are synthesized in the synthesizing. In this manner, the imaging data is acquired by dividing and imaging the first region and the second region, and the first division data and the second division data are synthesized even in a case where the imaging data is larger than the imaging region of the imaging device, and thereby it is possible to acquire the imaging data of the entire correcting pattern.

In the method for correcting the density irregularity, it is preferable that the correcting pattern has an overlap region in which a part of the first region overlaps a part of the second region.

Here, the overlap of a part of the first region and a part of the second region includes a case where edges of the first region and the second region overlap each other.

In the application example, since the first region and the second region overlap each other in the overlap region, the first division data and the second division data as the imaging data are also data including a region corresponding to the overlap region. In this case, when the first division data and the second division data are synthesized in the synthesizing, it is possible to generate imaging data corresponding to the entire region of the correcting pattern with accuracy. In other words, in a case where the overlap region is not provided in the first region and the second region, an edge of the first region and an edge of the second region need to be adjacent, in order to acquire the imaging data of the entire region of the correcting pattern. In this case, only a slight occurrence of an error in the imaging position results in a gap between the first region and the second region. By comparison, as described in the application example, the overlap region is provided in the first region and the second region, and thereby it is possible to acquire imaging data corresponding to the entire region of the correcting pattern even in a case where the imaging position is shifted, when an amount of the shift is within a width of the overlap region.

In the method for correcting the density irregularity of the application example, it is preferable that, in the synthesizing, a pixel value of a first pixel of the imaging device in the first division data and a pixel value of a second pixel corresponding to a position of the first pixel of the imaging device in the second division data in the overlap region are averaged.

In the application example, when the first division data and the second division data are synthesized so as to generate the imaging data, the pixel value (for example, a tone value) of the first pixel of the imaging device in the first division data and the pixel value of the second pixel corresponding to the position of the first pixel in the second division data in the overlap region are averaged. Thus, it is possible to acquire, as an average value, the pixel values corresponding to the first pixel and the second pixel in the imaging data, it is possible to reduce an influence of a noise on the imaging data, and it is possible to correct the density irregularity with high accuracy.

In the method for correcting the density irregularity of the application example, it is preferable that, in the acquiring of the first division data, the first region including a mark provided in a part of the overlap region is imaged, and in the acquiring of the second division data, the second region including the mark is imaged.

In the application example, when the first region or the second region is imaged, the mark provided in the overlap region is also imaged. In this case, using the mark, it is possible to easily position the first division data and the second division data with high accuracy, and it is possible to easily acquire the imaging data with higher accuracy.

The method for correcting the density irregularity of the application example, it is preferable to further include: causing the imaging device to relatively move with respect to the correcting pattern to a position at which the correcting pattern enters an imaging region by the imaging device; and stopping the relative movement of the imaging device with respect to the correcting pattern before the acquiring of the imaging data.

Here, in a case where the imaging data is acquired while the imaging device moves with respect to the medium on which the correcting pattern is provided, there is a concern that it is not possible to acquire the imaging data with high accuracy, due to vibration by the drive of the imaging device and a change in the distance between the imaging device and the medium.

By comparison, in the application example, after the imaging device is caused to relatively move to a position at which it is possible to image the correcting pattern by the moving, the stopping of the movement is performed and relative moving is stopped. Accordingly, since the imaging data is acquired in a state in which the medium and the imaging device are relatively immobilized, it is possible to reduce degradation in the quality of the imaging data due to the movement of the imaging device as described above, and it is possible to acquire the imaging data with high accuracy.

In the method for correcting the density irregularity of the application example, it is preferable that the correcting includes calculating a correction value that is used to correct the density irregularity, based on the imaging data.

In the application example, the correction value that is used to correct the density irregularity is calculated in the calculating of the correction value. The correction value is calculated, and thereby it is possible to easily perform the banding correction when the printing performed. In addition, since it is possible to calculate the correction value by the single printing apparatus, a configuration of a system is simplified, compared to a case where the imaging data is transmitted to an external device such as a separately connected personal computer and the correction value is calculated in the external device.

In the method for correcting the density irregularity of the application example, it is preferable that the correcting includes correcting an image by correcting a tone value of image data based on the correction value.

In the application example, the correction value is calculated in the calculating of the correction value, and the tone value of the image data is corrected based on the correction value calculated by the correcting of the image. Hence, since it is possible to calculate the correction value by the single printing apparatus, and it is possible to perform the correction of the tone value of the image data, a configuration of a system is simplified, compared to a case where the imaging data is transmitted to an external device such as a separately connected personal computer, the correction value is calculated in the external device, and the tone value of the printing image data is corrected.

It is preferable that the method for correcting the density irregularity of the application example further includes: printing an image on a medium, based on the image data of which the tone value is corrected based on the correction value.

In the application example, the image is printed in the printing, using the image data subjected to the correction of the density irregularity based on the imaging data. Hence, it is possible to print a high-quality image in which an occurrence of the density irregularity is reduced.

According to another application example of the invention, there is provided a printing apparatus including: an imaging device having an opening window to which light from a medium is incident. The imaging device images a correcting pattern that is used to correct the density irregularity and that contains a first pattern with first density and a second pattern with second density different from the first density, so as to acquire imaging data, and corrects the density irregularity based on the imaging data.

In the printing apparatus of the application example, similar to the invention described above, it is possible to image, by the imaging device, the correcting pattern set in the printing apparatus, and it is possible to easily acquire the correction value with accuracy because a position coordinate system obtained when the correcting pattern is generated is the same as a position coordinate system obtained when the correcting pattern is imaged.

It is preferable that the printing apparatus of the application example, further includes: a carriage that is provided with the imaging device and a printing portion which prints an image on a medium, and that is capable of relatively moving with respect to the medium; a first moving mechanism that causes the carriage to relatively move with respect to the medium in a first direction; and a second moving mechanism that causes the carriage to relatively move with respect to the medium in a second direction intersecting with the first direction. It is preferable that the imaging device images a first region of the correcting pattern sent in the second direction by the second moving mechanism so as to acquire first division data, images a second region of the correcting pattern further sent in the second direction by the second moving mechanism from an imaging position of the first region so as to acquire second division data, and synthesizes the first division data and the second division data so as to generate the imaging data.

In the application example, after the first region of the correcting pattern is imaged and the first division data is acquired, the imaging device and the medium relatively move with respect to each other in the second direction, the second region of the correcting pattern is imaged, and the second division data is acquired. The first division data and the second division data are synthesized so as to generate imaging data, and correction of the density irregularity is performed based on the imaging data. Thus, even in a case where the dimension of the correcting pattern is larger than the dimension of the imaging portion in the second direction, a plurality of items of division data are acquired so as to acquire imaging data, and thereby it is possible to correct the density irregularity.

In addition, as described above, since it is possible to change the imaging region in the correcting pattern with the medium set in the printing apparatus, it is possible to reduce an occurrence of the positional shift at the time of a change in the imaging range and it is possible to easily synthesize the first division data and the second division data.

In printing apparatus according to the application example, it is preferable that the printing portion has a plurality of ink ejecting ports arranged in the second direction, and the printing apparatus causes the carriage to relatively move with respect to the medium in the first direction, alternately performs a first process of causing ink to be ejected from the printing portion and a second process of causing the carriage to relatively move with respect to the medium in the second direction, and prints a plurality of the correcting patterns which are disposed in the first direction and which extend in the second direction.

In the printing apparatus of the application example, the printing portion has a plurality of nozzles arranged in the second direction and forms an image by alternately performing the first process of causing the carriage to move in the first direction and performing the printing on the medium and the second process of causing a printing position to move in the in the second direction. At this time, the printing portion forms a plurality of the patterns that are disposed in the first direction and extend in the second direction.

In the printing apparatus, in a case of forming an image having uniform density on a predetermined region, the first process and the second process are performed a plurality of times and the region is filled with dots. At this time, a distance of the relative movement of the carriage, which relatively moves in the second direction in the second process, varies depending on resolution of a printed image. The distance of the relative movement is decreased in a case of high resolution, and the distance of the relative movement is increased in a case of low resolution. In addition, since the distance of the relative movement is small in the case of the high resolution, it takes a long time to perform printing, whereas the distance of the relative movement is large in the case of the low resolution, and thus it can take a short time to perform printing. However, when the printing is performed at a high speed and the distance of the relative movement is increased, a dot formed position in the i-th first process and a dot formed position in the i+1-th first process are set with low accuracy, and thus the density irregularity is likely to occur in the second direction.

In the application example, regarding such density irregularity, the correcting pattern extending in the second direction is formed. Accordingly, it is easy to detect the density irregularity in the second direction. In addition, the plurality of patterns are arranged in the first direction in the correcting pattern of the application example. Accordingly, when the plurality of patterns are formed in levels of density different from each other, it is possible to detect whether or not there is density irregularity for each level of density.

According to another application example of the invention, there is provided an imaging module t imaging module comprising: an imaging device that has an opening window to which light from the medium is incident and that images a correcting pattern which is used to correct density irregularity and contains a first pattern with first density and a second pattern with second density different from the first density.

In the application example, the imaging module is capable of being mounted in the printing apparatus, and is capable of relatively move with respect to the medium by the moving mechanism provided in the printing apparatus. Accordingly, similar to the application example described above, it is possible to acquire the imaging data of the correcting pattern, with the medium (paper surface or the like), on which the correcting pattern is printed by the printing apparatus, set in the printing apparatus without translocation of the medium to a scanner or the like. Hence, similar to the application example described above, it is possible to reduce the occurrence of the positional error during the banding correction, and it is possible to rapidly obtain the accurate correction value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the figures.
Schematic Configuration of Printer FIG. 1 is a perspective view illustrating a schematic configuration of a printer 10 as a printing apparatus of the embodiment.

Figure 2:
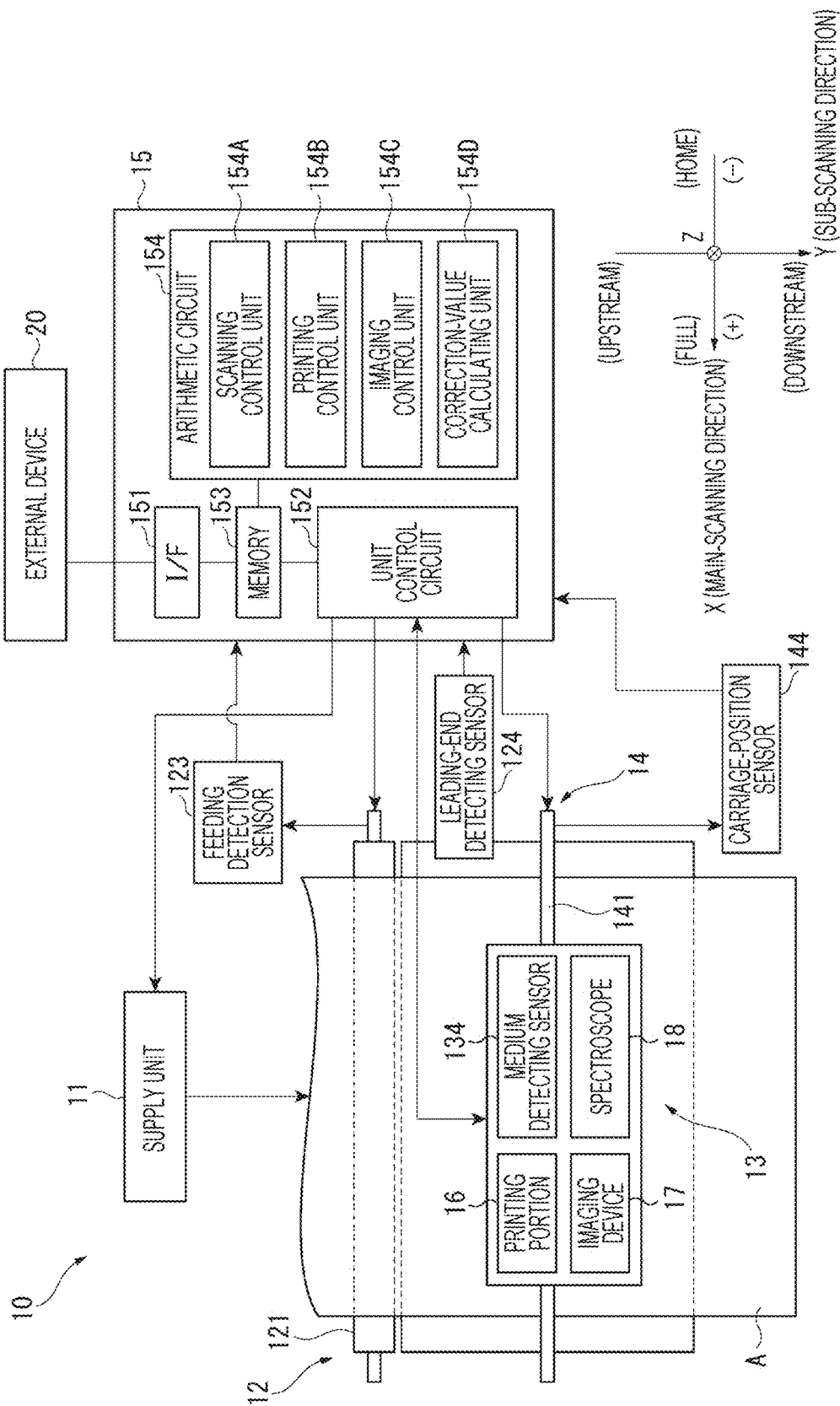
FIG. 2 is a block diagram illustrating a schematic configuration of the printer of the embodiment.

FIG. 2 is a block diagram illustrating a schematic configuration of the printer 10 of the embodiment.

Figure 1:
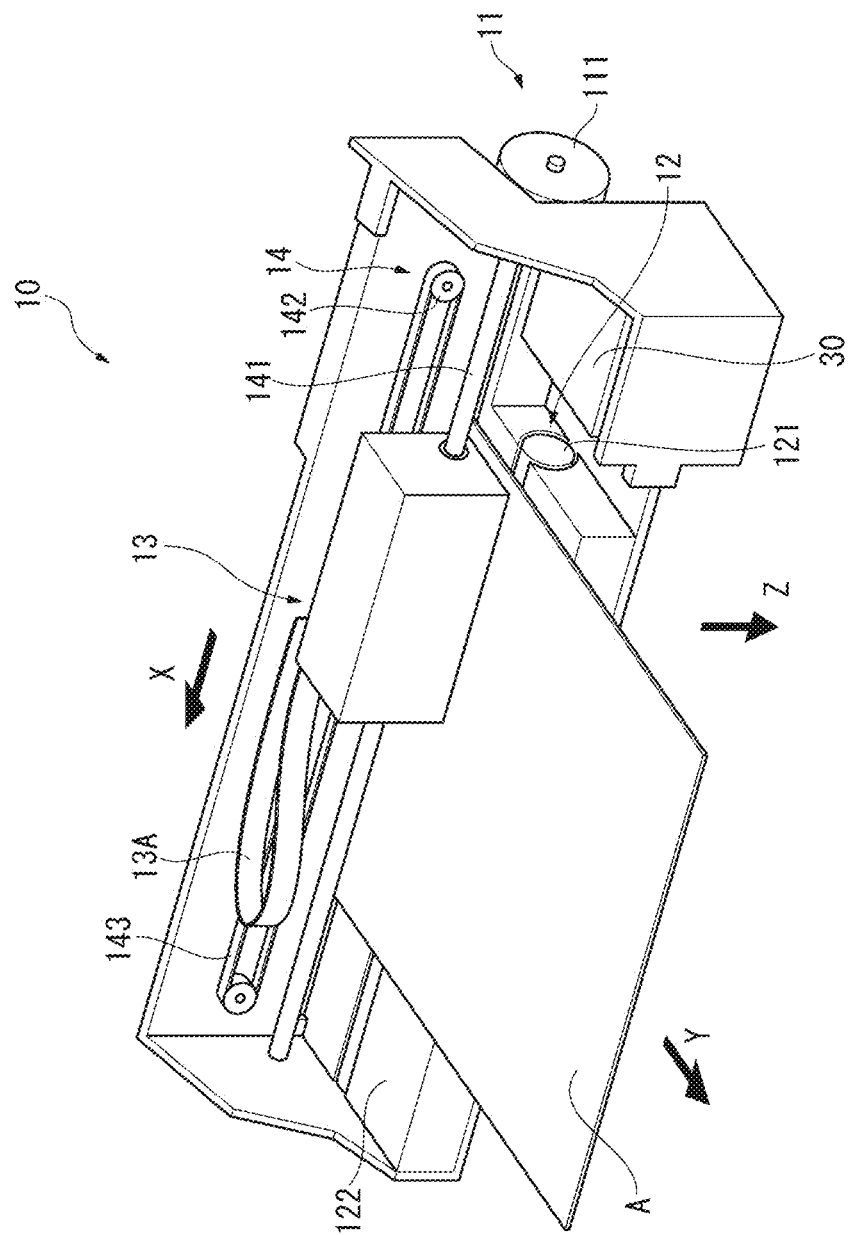
FIG. 1 is a perspective view illustrating a schematic configuration of a printer as a printing apparatus of an embodiment according to the invention.

As illustrated in FIG. 1, the printer 10 includes a supply unit 11, a transport unit 12, a carriage 13, a carriage moving unit 14, and a control unit 15 (refer to FIG. 2). The printer 10 controls the units 11, 12, and 14 and the carriage 13 so as to print an image on a medium A, based on print data input from an external device 20 such as a personal computer. In addition, the printer 10 of the embodiment forms a correcting pattern at a predetermined position on the medium A, based on image data that is used to form the correcting pattern set in advance to be used to correct density irregularity. Then, an imaging device 17 provided in the carriage 13 images a correcting pattern 40 (refer to FIG. 10) and performs correction (banding correction) of the density irregularity, based on the imaging data. In other words, in a case where the density irregularity is present in the imaging data with respect to the correcting pattern 40, the printer 10 identifies a position of the density irregularity and calculates a correction value that is used to correct the density irregularity.

Hereinafter, configurations of the printer 10 will be specifically described.

The supply unit 11 is a unit that supplies, to an image forming position, the medium A (exemplified by a paper surface in the embodiment) as the image forming target. The supply unit 11 includes a roll member 111 (refer to FIG. 1) around which the medium A is wound, a roll driving motor (not illustrated), a roll driving wheel train (not illustrated), and the like. The roll driving motor is driven to rotate, based on a command signal from the control unit 15, and a rotating force of the roll driving motor is transmitted to the roll member 111 via the roll driving wheel train. Thus, the roll member 111 rotates, and the paper surface wound around the roll member 111 is supplied to a downstream side (+Y side) in the Y direction (sub-scanning direction) corresponding to the second direction in the invention.

Note that, in the embodiment, the example, in which the paper surface wound around the roll member 111 is supplied, is described; however, the embodiment is not limited thereto. For example, the medium A may be supplied by any supply method in which the media A such as surfaces of sheets of paper stacked in a tray or the like are supplied one by one, or the like.

The transport unit 12 configures, together with the supply unit 11, a second moving mechanism and a second moving portion in the invention. The transport unit 12 transports, in the Y direction, the medium A supplied from the supply unit 11. The transport unit 12 is configured to include a transport roller 121, a driven roller (not illustrated) that is disposed with the transport roller 121 with the medium A nipped therebetween and is driven by the transport roller 121, and a platen 122.

When a transport motor (not illustrated) is driven through control by the control unit 15, a drive force is transmitted from the transport motor, the transport roller 121 is driven to rotate by the rotating force, and transports, with the driven roller, the medium A in the Y direction with the medium nipped therebetween. In addition, the platen 122 is provided on the downstream side (+Y direction) of the transport roller 121 in the Y direction so as to face the carriage 13 and supports the medium A. A printing process, an imaging process, a spectroscopic measurement process, or the like, are performed on the medium A within a region in which the medium A is supported by the platen 122.

In addition, various sensors such as a feed detecting sensor 123 (refer to FIG. 2) and a leading-end detecting sensor 124 (refer to FIG. 2) are provided in the transport unit 12. The feed detecting sensor 123 is a sensor that detects a transport amount of the medium A and can be exemplified by a rotary encoder or the like that detects an amount of rotation of the transport roller 121. The leading-end detecting sensor 124 is a sensor that detects a position of the leading end of the medium A that is sent to the platen 122 and can be exemplified by a switching sensor that senses contact of a leading end portion of the transported medium A.

Detection signals from the sensors 123 and 124 are appropriately output to the control unit 15.

As illustrated in FIG. 2, a printing portion 16, which prints an image on the medium A, an imaging device 17, which captures the image on the medium A, and a spectroscope 18, which performs spectroscopic measurement at a predetermined colorimetry position on the medium A, are mounted on the carriage 13.

The carriage 13 is provided to be capable of moving in an X direction (main-scanning direction) intersecting with the Y direction by the carriage moving unit 14. Note that, in the following description, a −X side is referred to as a Home side and a +X side is referred to as a Full side in a main-scanning direction (X direction). Here, the term, Home, represents a first position in the first direction in the invention and is a position at which the carriage 13 is retracted in a standby state in which the carriage does not perform the printing process. In addition, the term, Full, is a side opposite to the Home and represents a second position in the invention.

In addition, the carriage 13 is connected to the control unit 15 through a flexible circuit 13A and performs the printing process (image forming process on the medium A) by the printing portion 16, the imaging process by the imaging device 17, and the light intensity measuring process by the spectroscope 18, based on the command signal from the control unit 15.

Note that a detailed configuration of the carriage 13 will be described below.

The carriage moving unit 14 configures a first moving mechanism and a first-direction moving portion in the invention, and causes the carriage 13 to reciprocate in the X direction, based on the command signal from the control unit 15. Note that a moving mechanism in the invention is configured to include the carriage moving unit 14 which is the first moving mechanism, and the supply unit 11 and the transport unit 12 which are the second moving mechanism.

The carriage moving unit 14 is configured to include, for example, as illustrated in FIG. 1, a carriage guide shaft 141, a carriage motor 142 (referred to as a CR motor), and a timing belt 143.

The carriage guide shaft 141 is disposed in the X direction so as to have both end portions which are fixed, for example, to a housing of the printer 10. The carriage motor 142 drives the timing belt 143. The timing belt 143 is supported to be substantially parallel to the carriage guide shaft 141 and a portion of the carriage 13 is fixed to the timing belt. Thus, when the carriage motor 142 is driven, based on the command signal from the control unit 15, the timing belt 143 travels forward and backward, and the carriage 13 fixed to the timing belt 143 is guided by the carriage guide shaft 141 so as to reciprocate.

In addition, a carriage position sensor 144 is provided in the carriage moving unit 14. The carriage position sensor 144 is a sensor that detects the position of the carriage 13 and can be exemplified by a linear encoder or the like that detects an amount of movement of the carriage 13 in the X direction. A detection signal from the carriage position sensor 144 is appropriately input to the control unit 15.

Configuration of Carriage

Figure 3:
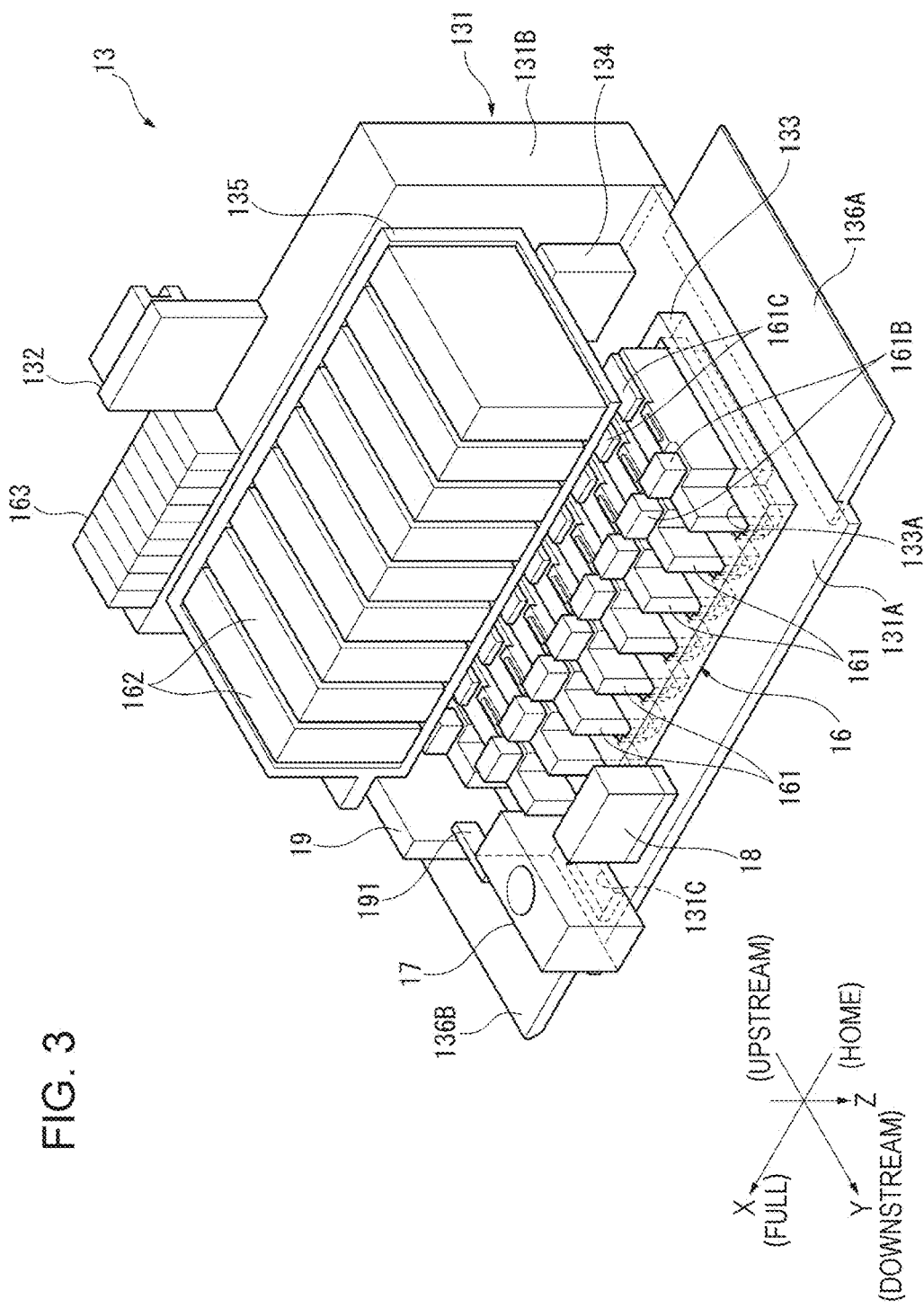
FIG. 3 is a perspective view illustrating a part of a carriage of the embodiment.

Next, a configuration of the carriage 13 will be described. FIG. 3 is a perspective view illustrating a part of the carriage 13.

An imaging module according to the invention is mounted on the carriage 13. As illustrated in FIG. 3, the carriage 13 includes a base 131, a connecting portion 132 fixed to the base 131, a unit mounting portion 133, a control board storage portion 135, and skid plates 136A and 136B. A medium detecting sensor 134, the printing portion 16, the imaging device 17, the spectroscope 18, a main circuit board 19 are mounted on the carriage 13.

As illustrated in FIG. 3, the base 131 includes a bottom portion 131A and a back surface portion 131B. The unit mounting portion 133, on which a plurality of nozzle units 161 of the printing portion 16 are detachably mounted, is fixed to the bottom portion 131A. In addition, the imaging device 17 and the spectroscope 18 are mounted on the bottom portion 131A. Note that the imaging device 17 and the spectroscope 18 may be detachably mounted on the base 131.

Further, the bottom portion 131A is provided with openings (illustrating only openings 133A and 131C corresponding to the nozzle units 161 and the imaging device 17 in FIG. 3) corresponding to the medium detecting sensor 134, the nozzle units 161 of the printing portion 16, the imaging device 17, and the spectroscope 18, respectively.

In addition, the bottom portion 131A includes the skid plate 136A extending from an end portion on the −X side to the −X side, and the skid plate 136B extending from an end portion on the +X side to the +X side. The skid plates 136A and 136B have a plate shape parallel to an XY plane and prevent the medium A from being jammed when the carriage 13 moves in the X direction.

The medium detecting sensor 134 is provided at a position (on a +Z side) on the Home side of the back surface portion 131B, at which the back surface portion abuts on the bottom portion 131A. The medium detecting sensor 134 faces the platen 122 through the opening corresponding to the medium detecting sensor 134 provided on the bottom portion 131A and detects transport of the medium A to the platen 122. For example, an example of a specific configuration of the medium detecting sensor 134 includes an optical sensor that has a light-emitting portion and a light-receiving portion in which the medium is irradiated with light from the light-emitting portion and the light-receiving portion receives light reflected from the medium A, and thereby the presence or absence of the medium A is detected.

In addition, the control board storage portion 135 is provided on the back surface portion 131B. A plurality of driver boards 162 corresponding to the nozzle units 161 of the printing portion 16 are stored in the control board storage portion 135. The driver boards 162 are disposed to have board surfaces, respectively, which have directions parallel to a YZ plane, and are provided side by side in the X direction.

Further, a cartridge filter 163 is detachably provided at a position of an end portion of the back surface portion 131B on the −Z side on the Full side. The cartridge filter 163 configures a part of the printing portion 16 and removes a foreign substance or the like contained in ink that is supplied to the nozzle unit 161 of the printing portion 16. A supply tube (not illustrated) is connected to the cartridge filter 163 and the supply tube is connected to a supply port 161B of the nozzle unit 161.

Note that, in the embodiment, an ink cartridge (not illustrated) is provided at a position separated from the carriage 13 inside the printer 10, and ink is supplied to the printing portion 16 through a tube member such as a tube from the ink cartridge.

In addition, the connecting portion 132 is fixed to a part (end portion on the −Z side in the embodiment as illustrated in FIG. 3) of the back surface portion 131B. The connecting portion 132 is connected to the carriage moving unit 14.

Configuration of Printing Portion 16

The printing portion 16 separately ejects, in a portion facing the medium A, the ink on the medium A and an image is formed on the medium A.

The printing portion 16 includes the nozzle unit 161, the driver board 162, and the cartridge filter 163.

The nozzle units 161 are provided corresponding to colors (for example, cyan, magenta, yellow, light cyan, light magenta, grey, light grey, matt black, photo black, or the like), respectively, of inks that are ejected to the medium A.

The nozzle units 161 are provided at the opening 133A provided in the bottom portion 131A of the unit mounting portion 133 and the base 131, and the bottom of the nozzle unit 161 meets a surface of the bottom portion 131A, which faces the platen 122.

Figure 4:
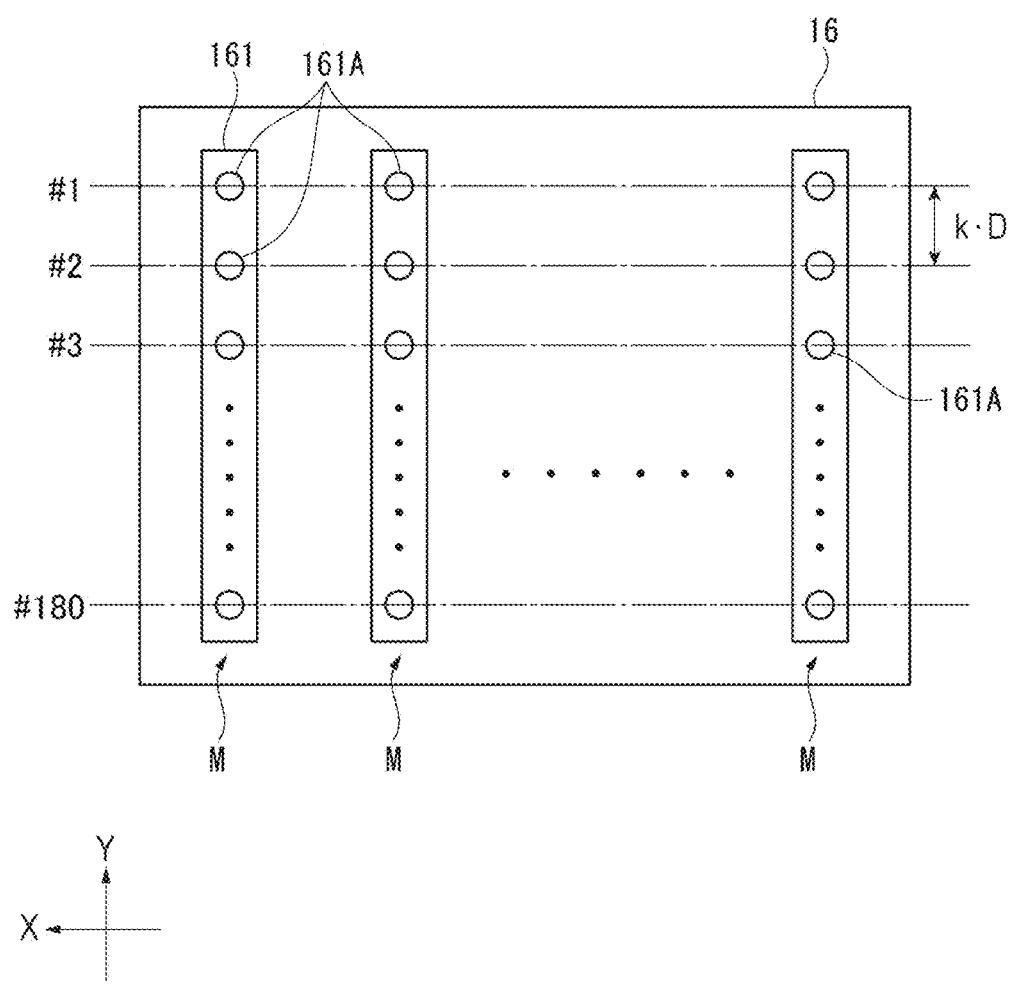
FIG. 4 is a view depicting arrangement of nozzles in a printing portion of the embodiment.

FIG. 4 is a view depicting arrangement of nozzles 161A in the printing portion 16.

A nozzle group M of the nozzles 161A (ink ejecting ports) is formed to be aligned in the Y direction in an underside of each of the nozzle units 161. The plurality of nozzles 161A of each of the nozzle groups M are aligned at uniform intervals (nozzle pitch: k·D) in the Y direction (transport direction). Here, D represents the minimum dot pitch (that is, intervals of dots formed on the medium A in the highest resolution) in the Y direction. In addition, k is an integer equal to or greater than 1. For example, in a case where the nozzle pitch is 180 dpi (1/180 inches) and the dot pitch in the Y direction is 720 dpi (1/720 inches), k=4. The nozzles 161A of each of the nozzle groups are assigned with a number that is lowered as the nozzle 161A is disposed on the downstream side (#1 to #180). An ink ejecting mechanism (not illustrated) is provided to each of the nozzles 161A. An example of the ink ejecting mechanism can include a configuration in which an ink chamber and a piezoelectric element are provided, the ink chamber is contracted and expanded by drive of the piezoelectric element such that an ink droplet is ejected from the nozzle 161A.

The nozzle unit 161 is provided with a supply port 161B, to which the supply tube extending from the cartridge filter 163 is connected, and the ink is guided from the ink cartridge (or an ink tank) separately provided in the printer 10 through the cartridge filter 163.

In addition, a unit circuit 161C, which is provided with a connector and a control circuit that are each connected to the driver board 162, is provided in the nozzle unit 161, and the connector of the unit circuit 161C is connected to the driver board 162 by an FPC or the like.

Note that a printing method on the medium A by the printing portion 16 will be described below.

The driver boards 162 are stored on the control board storage portion 135 of the carriage 13 described above. As described above, the driver boards 162 is connected to the unit circuit 161C of the corresponding nozzle unit 161. In addition, the driver boards 162 are connected to the control unit 15 of the printer 10 via the main circuit board 19, controls the ink ejecting mechanisms of the nozzle units 161 such that ink is ejected from the nozzle 161A, based on the command signal from the control unit 15.

As described above, the cartridge filter 163 filters the ink supplied from the ink cartridge or the ink tank, which are provided outside that carriage 13 so as to remove a foreign substance and then the ink is supplied to the nozzle unit 161. The cartridge filter 163 is detachably mounted on the carriage 13, and thus it is possible to regularly perform maintenance such as replacement.

Configuration of Imaging Device 17

Figure 5:
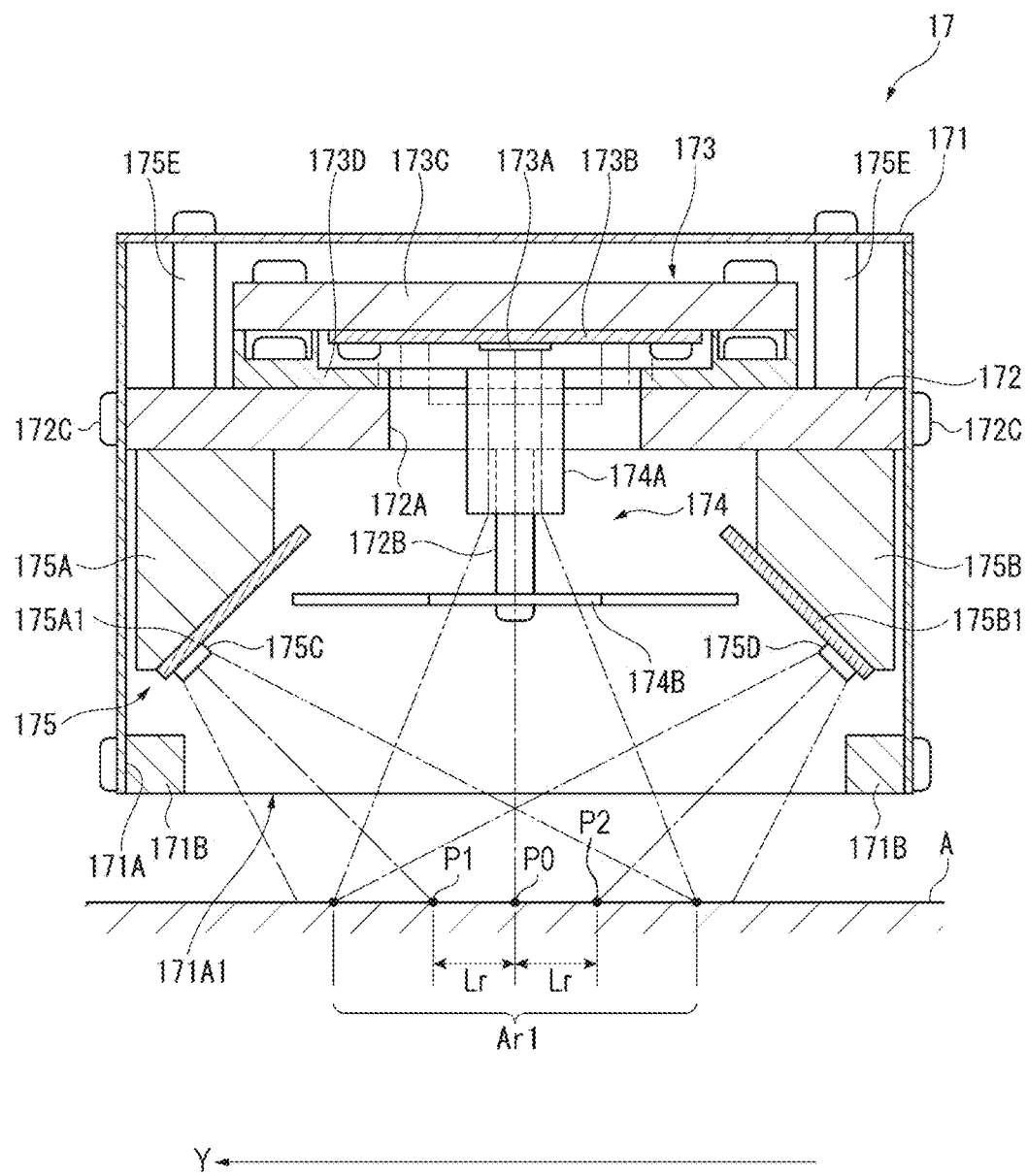
FIG. 5 is a sectional view illustrating a schematic configuration of an imaging device of the embodiment.

FIG. 5 is a sectional view illustrating a schematic configuration of the imaging device 17.

As illustrated in FIG. 3, the imaging device 17 is provided on the +Y side (downstream side) in the Y direction on the Full side further than the printing portion 16 in the X direction.

As illustrated in FIG. 5, the imaging device 17 is configured to include a housing 171, a main plate 172, a sensor unit 173, an imaging optical system 174, and a light source unit 175.

The main plate 172, the sensor unit 173, the imaging optical system 174, and the light source unit 175 are accommodated in the housing 171. The housing 171 is formed of a material such as aluminum which is lightweight and has a high thermal conductivity. The housing 171 is provided with an opening window 171A in the underside (surface facing the bottom portion 131A). The opening window 171A is formed to have the same shape as an opening 131C provided in the bottom portion 131A and is disposed to overlap the opening 131C. In addition, an underside fixing portion 171B is provided in an inner circumferential surface of the opening window 171A of the housing 171. The underside fixing portion 171B has the underside, which is formed on the same plane as the opening plane 171A1 in the opening window 171A and the underside is fixed to the bottom portion 131A of the carriage 13. Note that there is no particular limitation on a fixing method of the underside fixing portion 171B and the bottom portion 131A; however, it is preferable to employ a configuration in which the underside fixing portion and the bottom portion are detachably fixed by being screwed or the like.

The main plate 172 is disposed to be parallel (or substantially parallel) to the XY plane in the housing 171, and is fixed to the housing 171 through a fixing member such as a fixing screw 172C. Note that the fixing of the main plate 172 is not limited to using the fixing screw 172C, and various fixing methods such as fixing using an adhesive may be used.

In addition, the main plate 172 has a connector portion (not illustrated) that connects to the main circuit board 19. The connector portion is exposed to the outside of the housing 171 through an opening formed in a part of the housing 171, which corresponds to a position of the main plate 172, and the connector portion is connected to the main circuit board 19 through a wire 191.

Further, an opening 172A along an optical axis of the sensor unit 173 (imaging element 173A) is formed in the main plate 172 and a lens unit 174A that configures the imaging optical system 174 is disposed in the opening 172A. In addition, a filter holding portion 172B extending to the +Z side in the Z direction is provided on an underside (opening window 171A side) of the main plate 172. A flare-cut filter 174B that configures the imaging optical system 174 is held at the front end of the filter holding portion 172B.

The sensor unit 173 is fixed to a surface (surface on a side opposite to the opening window 171A) of the main plate 172. The sensor unit 173 is configured to include an imaging element 173A, a sensor board 173B, a first sensor mount 173C, and a second sensor mount 173D.

The imaging element 173A is an RGB image sensor having a plurality of pixels, receives light after being reflected from a predetermined imaging region of the medium A and then passing through the opening 131C, the opening window 171A, and the imaging optical system 174, and outputs, from each pixel, an electrical signal generated according to an amount of light reception. In addition, in the embodiment, the imaging element 173A captures an image of an imaging region Ar1 on the medium A. The imaging region Ar1 has a dimension of a length in the X direction shorter than a dimension of a length in the Y direction, and, for example, in the embodiment, is a rectangular region that is 0.8 inches (20.32 mm) in the X direction and 1 inch (25.4 mm) in the Y direction.

In addition, the imaging element 173A is mounted on the sensor board 173B. The sensor board 173B is mounted on a first sensor mount 173C and the first sensor mount 173C is fixed to a second sensor mount 173D that is mounted on the main plate 172. Thus, the sensor unit 173 is fixed to the main plate 172 such that the optical axis of the imaging element 173A passes through the central point of the opening 172A of the main plate 172.

The electrical signal output from the imaging element 173A is output to the main plate 172 via a circuit provided in the sensor board 173B, a circuit provided in the first sensor mount 173C, and a circuit provided in the second sensor mount 173D, and further is output to the main circuit board 19 from the main plate 172 via the wire 191.

The imaging optical system 174 includes the lens unit 174A and the flare-cut filter 174B.

The lens unit 174A causes the light reflected from the imaging region of the medium A to form an image in the imaging element 173A and is configured of combination of a plurality of lenses.

In a case where light from the light source unit 175 is subjected to diffuse reflection from the front surface of the medium A, the flare-cut filter 174B is a filter that reduces an influence of the diffuse reflection.

As described above, the lens unit 174A and the flare-cut filter 174B are fixed to the main plate 172. Here, the lens unit 174A and the flare-cut filter 174B are each disposed to have optical axes of the lens unit 174A and the flare-cut filter 174B matching the optical axis of the imaging element 173A.

The light source unit 175 is configured to include a first light source mount 175A, a second light source mount 175B, a first light source 175C, and a second light source 175D.

The first light source mount 175A and the second light source mount 175B are provided to interpose the imaging element 173A in the Y direction when viewed in the Z direction. In other words, the first light source mount 175A is provided at the central position of the main plate 172 in the X direction at the end portion on the +Y side of the main plate 172 in the Y direction. In addition, the second light source mount 175B is provided at the central position of the main plate 172 in the X direction at the end portion on the −Y side of the main plate 172 in the Y direction. Note that the imaging element 173A is provided at the central position (barycentric position) of the main plate 172.

Base end portions (end portions on the −Z side) of the first light source mount 175A and the second light source mount 175B are fixed to the main plate 172 by a fixing member 175E such as a bolt. In addition, inclined fixing portions 175A1 and 175B1, which are provided with the first light source 175C and the second light source 175D, respectively, are inclined to face the optical axis of the imaging element 173A and are provided at front end portions (end portions on the +Z side) of the first light source mount 175A and the second light source mount 175B.

As illustrated in FIG. 5, an inclined angle of the inclined fixing portion 175A1 is set such that a light-irradiating direction of the first light source 175C mounted on the first light source mount 175A is toward the +Y side by a predetermined distance Lr further than an intersection point (imaging center P0) of the optical axis of the imaging element 173A and the medium A.

An inclined angle of the inclined fixing portion 175B1 is set to be on the −Y side by the distance Lr further than the imaging center P0.

Note that, in FIG. 5, an example, in which the inclined fixing portions 175A1 and 175B1 have an inclined surface having a distance longer from the optical axis of the imaging element 173A as a portion of the inclined fixing portions is closer to the +Z side, is described; however, the configuration is not limited thereto. For example, the inclined fixing portions 175A1 and 175B1 may be configured to have a curved shape (shape configuring a part of a circumferential surface of a cone) having a distance that is further separated from the optical axis of the imaging element 173A as a portion of the inclined fixing portions is closer to the +Z side. In addition, the example, in which the first light source mount 175A and the second light source mount 175B are configured to have the inclined fixing portion 175A1 and the inclined fixing portion 175B1, is described; however, for example, a rotating mechanism, which is capable of changing the light-irradiating directions of the first and second light sources 175C and 175D, may be provided in a configuration and the light-irradiating direction may be set to be toward the imaging center P0.

The first light source 175C and the second light source 175D are configured of light sources that have a small size such as an LED and that has a small amount of power consumption. The first light source 175C and the second light source 175D are connected to the main circuit board 19 via circuits provided in the first light source mount 175A and the second light source mount 175B, respectively, a circuit provided in the main plate 172, and the wire 191, and the first and second light sources irradiate the imaging region Ar1 with light, based on an imaging command signal from the main circuit board 19.

In addition, as described above, the first light source 175C irradiates, with light, a first illumination center P1 on the +Y side by the distance Lr further than the imaging center P0. Accordingly, the medium A is irradiated, with the first illumination center P1 as the center, with light having the light intensity that is reduced as an irradiating portion is separated from the first illumination center P1. By comparison, the second light source 175D irradiates, with light, a second illumination center P2 on the −Y side by the distance Lr further than the imaging center P0. Accordingly, the medium A is irradiated, with the second illumination center P2 as the center, with light having the light intensity that is reduced as an irradiating portion is separated from the second illumination center P2.

Here, the distance Lr described above is appropriately set such that the imaging region Ar1 is irradiated with uniform light when the imaging region Ar1 is irradiated with the illumination light emitted from the first light source 175C and the second light source 175D. In other words, as described above, since the imaging region Ar1 is long in the Y direction, the light intensity of the illumination light is decreased and the density irregularity is increased, especially on both end sides (±Y sides) in the Y direction when the imaging center P0 is illuminated by the light sources 175C and 175D.

Hence, in the embodiment, the first illumination center P1 is shifted to the +Y side from the imaging center P0 by the distance Lr and the second illumination center P2 is shifted to the −Y side from the imaging center P0 by the distance Lr. In addition, irradiation is performed with light from the first light source 175C from the +Y side further than the first illumination center P1, and irradiation is performed with light from the second light source 175D from the −Y side further than the second illumination center P2. Accordingly, the irradiation is performed to extend on the −Y side with the light of the first light source 175C with the +Y side of the imaging region Ar1 as the center, and the irradiation is performed to extend on the +Y side with the light of the second light source 175D with the −Y side of the imaging region Ar1 as the center. Thus, the imaging region Ar1 is irradiated with substantially uniform light, and thereby it is possible to reduce luminance irregularity in the imaging data due to non-uniformity of the light intensity of the light source.

Note that, in a case where a configuration, in which the light sources 175C and 175D can illuminate a wide range with uniform light, is employed, for example, in a case where an integrator optical system configured of a fly-eye lens or the like is provided, the light sources 175C and 175D may be disposed such that the first illumination center P1 and the second illumination center P2 match the imaging center P0.

In addition, in the embodiment, since the housing 171 that accommodates the light source unit 175 is configured of a material such as aluminum having a high thermal conductivity, it is possible to dissipate, to the housing 171, heat generated by the light source unit 175, and thus it is possible to reduce degradation of the functions of the imaging element 173A due to the heat.

Configuration of Spectroscope 18

The spectroscope 18 is provided on the +Y side (downstream side) further than the printing portion 16 in the Y direction on the Home side further than the imaging device 17 in the X direction.

The spectroscope 18 measures spectrum at a predetermined position on the medium A. The spectroscope 18 includes, for example, a light source such as an LED, a spectroscopic unit configured of an etalon or the like, and a detector that receives light having a predetermined wave length that is dispersed by the spectroscopic unit, although not illustrated. The spectroscope 18 is electrically connected to the control unit 15 via the main circuit board and performs the spectroscopic measurement process in response to a spectroscopic measurement command signal from the control unit 15.

Configuration of Main Circuit Board 19

The main circuit board 19 is electrically connected to driver boards 162 of the printing portion 16, the imaging device 17, the spectroscope 18, and the control unit 15. The main circuit board 19 drives the printing portion 16, the imaging device 17, and the spectroscope 18, based on the command signal from the control unit 15.

For example, in the drive of the imaging device 17, the main circuit board 19 performs drive control of the imaging element 173A, drive control of the light source unit 175 and images the imaging region Ar1 of the medium A, based on the imaging command signal from the control unit 15 (the imaging process). In addition, the main circuit board 19 includes a circuit such as an AD converter or an amplifier, in which an electrical signal that is transmitted from the imaging element 173A after being input from the main plate 172 is processed and the processed electrical signal is output to the control unit 15 as an image signal (imaging data).

As illustrated in FIG. 3, the main circuit board 19 described above is disposed to be parallel to the XY plane so as to intersect with (in the embodiment, orthogonal to) the opening plane of the opening window 171A (opening 131C). Thus, it is possible to reduce the size of the carriage 13 in the X direction and the Y direction, compared to a case where the main circuit board 19 is disposed to be parallel to the XY plane.

In other words, the nozzle units 161 having a longitudinal direction in the Y direction are disposed to be parallel to the X direction in the printing portion 16 of the carriage 13. In addition, the driver boards 162 accommodated in the control board storage portion 135 are disposed to be parallel to the X direction on the −Z side so as to correspond to the nozzle units 161. When the main circuit board 19 is disposed on the carriage 13 in this configuration so as to have the board surface that is parallel to the XY plane, the carriage 13 is increased in size in the XY plane direction, and a dead space is formed above the main circuit board 19 (−Z side). By comparison, as described above, the main circuit board 19 is disposed to have the board surface parallel to a ZY plane similar to the nozzle units 161 and the driver boards 162 of the printing portion 16, thereby saving a space in the carriage 13 and making it possible to realize miniaturization of the carriage 13.

In addition, in the embodiment, the imaging device 17 and the spectroscope 18 are provided on the +Y side of the carriage 13 in the Y direction and on the +X side (Full side) in the X direction, which will be described below in detail. By comparison, as illustrated in FIG. 3, the main circuit board 19 is disposed to be parallel to the driver board 162 on the Full side further than the printing portion 16. In this configuration, the main circuit board 19 may be disposed at a position close to all of the driver board 162, the imaging device 17, and the spectroscope 18 and it is possible to reduce lengths of connection lines. In this case, it is possible to simplify the configuration and reduce degradation of the signal due to a noise.

Particularly, in the embodiment, a parallel communication type of wire is used as the wire 191 connecting the main circuit board 19 and the imaging device 17. In the parallel communication, crosstalk is likely to occur because the signal lines are parallel to each other. Here, in a case where the wire 191 is longer than 200 mm in length, an influence of the crosstalk is increased and it is difficult to acquire highly accurate imaging data. By comparison, in the embodiment, the wire 191 is 200 mm or shorter in length. In this case, as described above, it is possible to reduce the degradation of the signal due to the crosstalk of the signal lines, and thus it is possible to acquire imaging data of which a noise is decreased.

Note that, for example, a wire based on a standard for a low voltage differential signal (LVDS) may be used as the wire 191. In this case, it is possible to reduce the influence of the noise or the like even in a case where the wire is long, compared to the wire 191 of the parallel communication. However, in the case where wire is used by the LVDS, hardware that performs the process of a differential signal needs to be separately provided, which results in high costs and complication of the apparatus.

Position of Imaging Device 17 in Carriage 13

As described above, in the carriage 13, the printing portion 16 is disposed on the Home side in the X direction, and the imaging device 17 is disposed on the Full side further than the printing portion 16.

In order to prevent the nozzles 161A of the nozzle unit 161 from being clogged with ink, a maintenance box 30 (maintenance unit), which performs maintenance of the nozzle unit 161, is provided in the printer 10. As illustrated in FIG. 1, the maintenance box 30 is provided at a Home position of the printer 10. At the time of maintenance, the carriage 13 is caused to move to the Home position, and then ink is ejected from the nozzle 161A (flushing).

Here, in the carriage 13, in a case where the printing portion 16 is positioned on the Full side, corresponding to this case, the maintenance box 30 also needs to be shifted to the Full side, and thus the printer 10 is increased in size in the X direction. By comparison, in the embodiment, since the printing portion 16 is provided on the Home side of the carriage 13, the maintenance box 30 may also be provided at an end position on the −X side in the printer 10, and thus it is possible to decrease the printer 10 in size.

In addition, the imaging device 17 is provided on the Full side of the printing portion 16. Hence, even when the carriage 13 moves to the Home position, the imaging device 17 does not interfere with the maintenance box 30 even during the movement of the carriage 13. Accordingly, the imaging device 17 passes over the maintenance box 30, and thereby it is possible to reduce ink stain or the like on the imaging device 17, and it is possible to reduce degradation of the functions of the imaging device 17.

Further, the imaging device 17 is provided on the +Y side (downstream side) further than the printing portion in the Y direction. Therefore, when the correcting pattern 40 printed by the printing portion 16 is transported to the downstream side, it is possible to immediately image the correcting pattern 40 by the imaging device 17. Accordingly, it is possible to rapidly perform banding correction based on imaging data of the correcting pattern 40.

Note that it is considered that the imaging device 17 is disposed on the upstream side of the printing portion 16; however, in this case, the medium A needs to be transported to the upstream side after the correcting pattern 40 is printed by the printing portion 16.

Configuration of Control Unit 15

The control unit 15 is a controller in the invention, and, as illustrated in FIG. 2, is configured to include an I/F 151, a unit control circuit 152, a memory 153, and an arithmetic circuit 154.

The I/F 151 inputs, to the arithmetic circuit 154, print data, which is input from the external device 20.

The unit control circuit 152 includes control circuits that control the supply unit 11, the transport unit 12, the carriage 13, and the carriage moving unit 14, respectively, and controls operations of the units, based on the command signal from the arithmetic circuit 154.

The memory 153 stores various programs and various items of data that are used to control the operations of the printer 10.

The arithmetic circuit 154 is configured of an arithmetic circuit such as a central processing unit (CPU) or a storage circuit, reads and executes the various programs stored in the memory 153, thereby functioning as a scanning control unit 154A, a printing control unit 154B, an imaging control unit 154C, and a correction value calculating unit 154D, as illustrated in FIG. 2.

The scanning control unit 154A outputs, to the unit control circuit 152, a command signal indicating the drive of the supply unit 11, the transport unit 12, and the carriage moving unit 14. Thus, the unit control circuit 152 drives the roll driving motor of the supply unit 11 such that the medium A is supplied to the transport unit 12. In addition, the unit control circuit 152 drives the transport motor of the transport unit 12 such that a predetermined region of the medium A is transported in the Y direction to a position of the platen 122 that faces the carriage 13. In addition, the unit control circuit 152 drives the carriage motor 142 of the carriage moving unit 14 such that the carriage 13 moves in the X direction.

The printing control unit 154B outputs, to the carriage 13 via the unit control circuit 152, a printing command signal indicating the drive and control of the printing portion 16, based on the print data input from the external device 20. The main circuit board 19 of the carriage 13 outputs a command indicating the drive of the nozzle unit 161 to the corresponding driver board 162, based on the printing command signal. Thus, the driver boards 162 drive the nozzle drive mechanism (piezoelectric element) of the nozzle unit 161 and ink is ejected from the nozzle 161A to the medium A.

Note that, when the printing is performed, the carriage 13 moves in the X direction, a dot forming operation (first process) of ejecting ink from the printing portion 16 and forming a dot during the movement and a transport operation (second process) of transporting the medium A in the Y direction are alternately repeated, and an image configured of a plurality of dots is printed on the medium A, which will be described below in detail.

The imaging control unit 154C performs the imaging process by the imaging device 17. Specifically, the imaging control unit 154C outputs, to the carriage 13 via the unit control circuit 152, an imaging command signal indicating the drive of the imaging device 17. The main circuit board 19 of the carriage 13 outputs, to the imaging device 17, a drive command of the light source unit 175 and a drive command of the imaging element 173A, based on the imaging command signal, and causes the imaging data of the imaging region Ar1 on the medium A to be acquired.

The correction value calculating unit 154D calculates a correction value used to correct the banding, based on the imaging data of the correcting pattern 40 acquired by the imaging device 17. The calculated correction value is stored in the memory 153 and is applied to the next printing process by the printing portion 16, and thereby the banding is corrected.

In addition, the arithmetic circuit 154 functions as a measurement control unit that performs the spectroscopic measurement process on a predetermined measurement position on the medium A using the spectroscope 18, a colorimetry unit that measures a color by calculating chromaticity on a measurement position according to a spectroscopic measurement result, and a calibration unit that updates printing profile data according to a colorimetry result.

Drive Control of Printer 10
Printing Process on Medium A by Printing Portion 16

Next, forming (printing process) of an image on the medium A by the printer 10 will be described.

Figure 6:
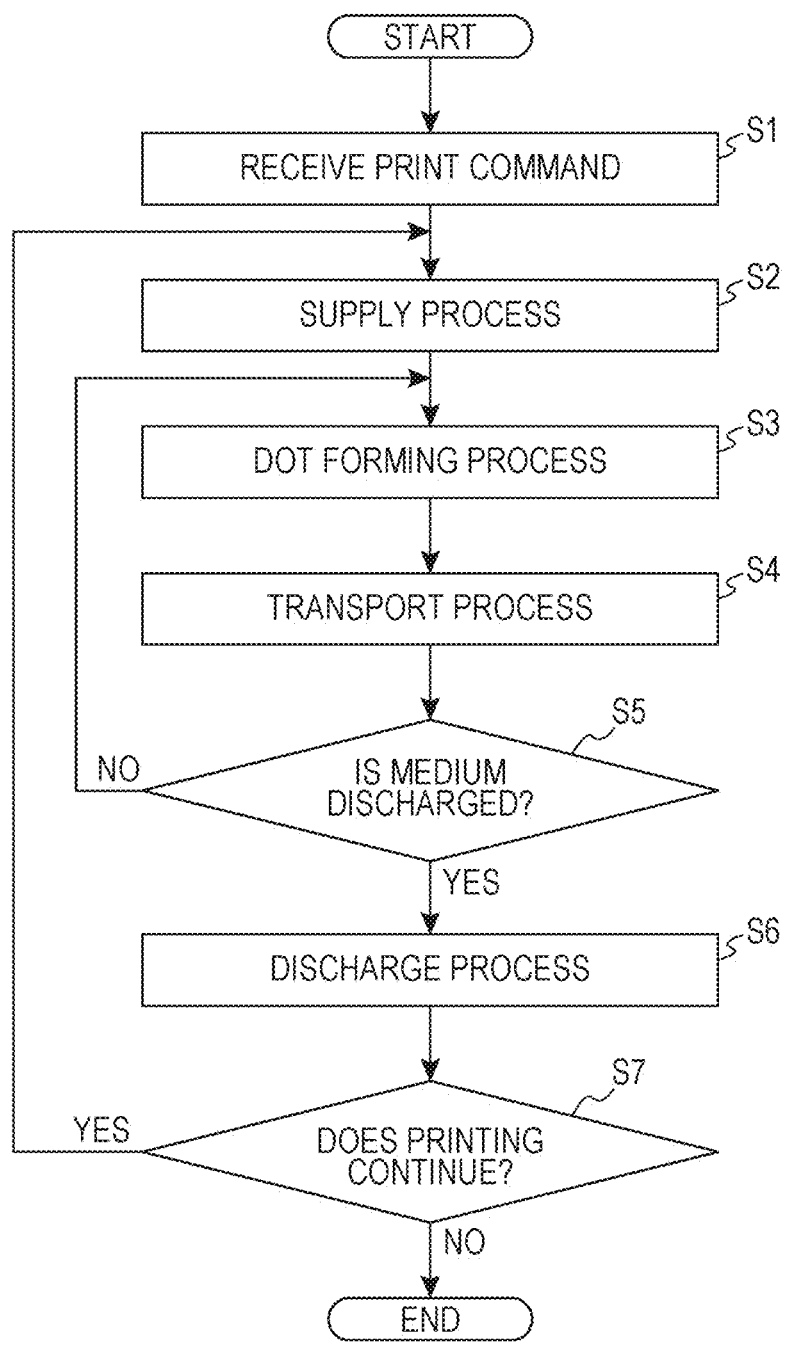
FIG. 6 is a flowchart illustrating a printing process performed by the printer of the embodiment.

FIG. 6 is a flowchart illustrating the printing process performed by the printer 10.

In a case where the printer 10 forms an image on the medium A, as illustrated in FIG. 6, the control unit 15, first, acquires the printing command (Step S1). The printing command may be transmitted from the external device 20, or may be input through an operation of an operating portion (not illustrated) provided in the printer 10. The image data that is printed on the medium A may be acquired from the external device 20 or the image data of the correcting pattern 40 may be stored in the memory 153 in a case where the correcting pattern 40 is printed to be used when the banding correction is performed.

The printing control unit 154B performs the following various processes of the supply process, the dot forming process, or the transport process, based on the printing command, using the units.

First, the scanning control unit 154A supplies the medium A (supply process: Step S2). In other words, the scanning control unit 154A controls the supply unit 11 and the transport unit 12, supplies the medium A as a printing target in the printer 10, and positions the medium A to a printing start position (refer to as a start identification position).

Next, the printing control unit 154B causes the printing portion 16 to eject ink and causes a dot to be formed (dot forming process: Step S3). At this time, the scanning control unit 154A causes the carriage 13 to move in the X direction, and the ink is intermittently ejected from the nozzle 161A of the printing portion 16 during movement of the carriage 13. In other words, the dot forming process corresponds to the first process in the invention. When the ink droplet lands on the medium A, a dot is formed on the medium A. Since the nozzle 161A ejects the ink during the movement of the carriage 13 in the X direction, a dot row (raster line) formed of the plurality of dots is formed on the medium A in the X direction.

Next, the scanning control unit 154A controls the supply unit 11 and the transport unit 12 and transports the medium A to the downstream side in the Y direction (transport process: Step S4). In other words, the transport process corresponds to the second process in the invention. Through the transport process, the carriage 13 moves to a position different from the position of the dot formed in the dot forming process in Step S3, and it is possible to form a dot at a corresponding movement position at the time of the next dot forming process.

In addition, the printing control unit 154B determines whether or not discharge of the medium A during the printing is performed (discharge determination: Step S5). In Step S5, in a case where data, which needs to be printed on paper on which the printing is performed, remains (case of being determined to be NO), the discharge of the medium A is not performed. In this case, the flow returns to Step S3, and the dot forming process in Step S3 and the transport process in Step S4 are alternately repeated until the data that needs to be printed is not present.

By comparison, in Step S5, in a case of being determined to be YES, that is, a case where data that needs to be printed is not present, or a case where a print stop request from a user, or a print stop request due to an error is received, the printing control unit 154B stops the printing process, and the scanning control unit 154A controls the transport unit 12 such that the discharge operation of the medium A is performed (discharge process: Step S6).

Then, the printing control unit 154B determines whether or not the printing is continued (printing continuation determination: Step S7). In the Step S7, in a case where the printing process is continued (a case of being determined to be YES), such as a case where the next print data is input, the flow returns to Step S2, and the printing process from Step S2 to Step S6 is continued. In Step S7, in a case where the printing process is ended (a case of being determined to be NO), such as a case where the next print data is not present, the printing process is ended.

Forming of Raster Line

As described above, in the printing process of the printer 10 of the embodiment, a raster line is formed in the X direction through the dot forming process. Here, the dot forming process performed once (forming of dots when the printing portion scans once) is referred to as "pass", and a printing method, in which an unrecorded raster line is interposed between raster lines recorded in the pass performed once, is referred to as interlace printing. Note that in the following description, "pass n" means the n-th dot forming process.

Figure 7:
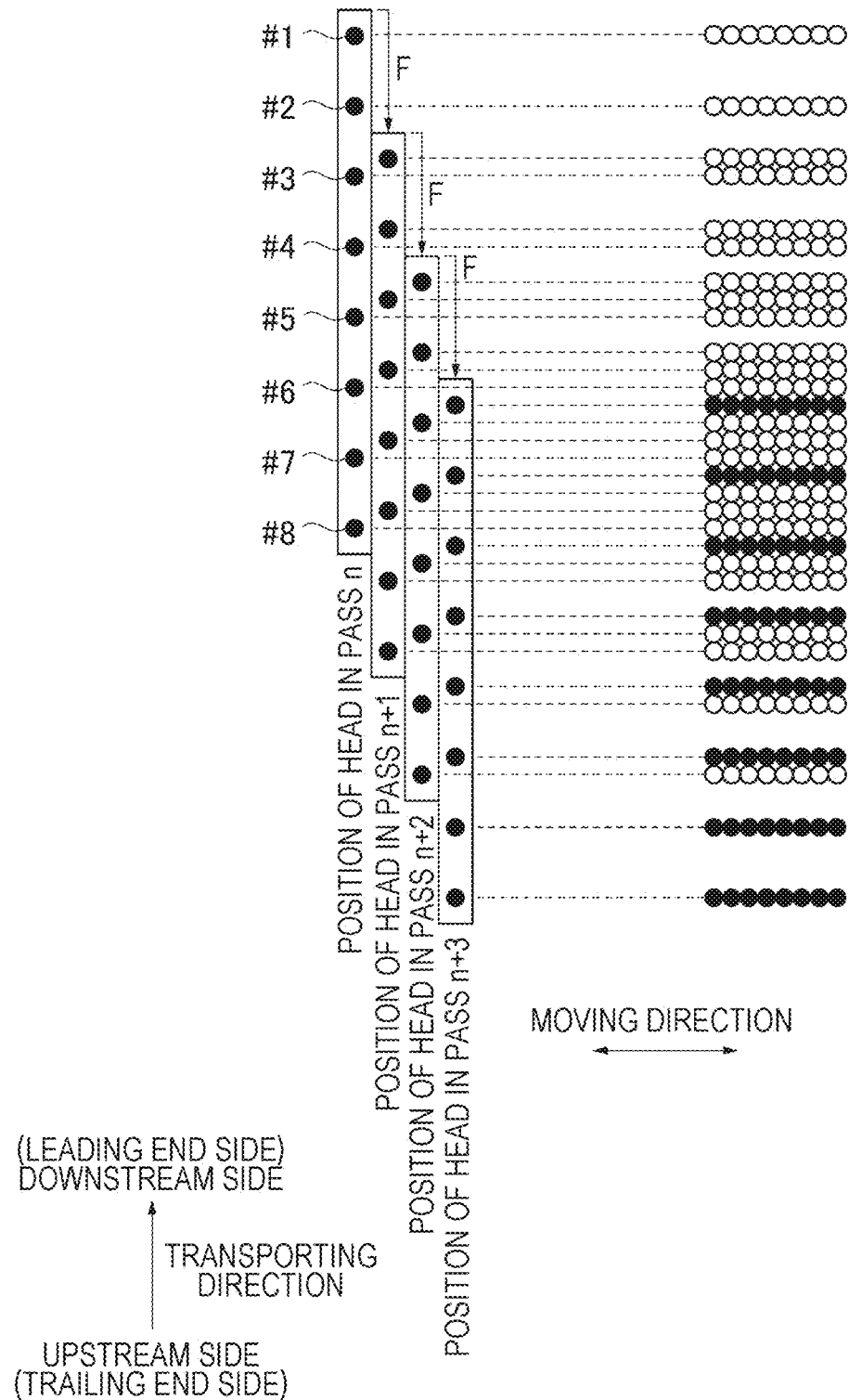
FIG. 7 is a view depicting a case where a head length is filled through four passes in interlace printing.

FIG. 7 is a view depicting a case where a head length (distance between both end portions of the plurality of nozzles 161A aligned in the Y direction) is filled through four passes in the interlace printing. FIG. 7 illustrates an example of a position of the carriage 13 and forming of a dot in pass n to pass n+3.

For the convenience of the description, only one row is illustrated in the Y direction by one nozzle unit 161 of the plurality of nozzle units 161, and the number of the nozzles 161A is reduced in FIG. 7. In addition, the nozzle unit 161 is drawn to move with respect to the medium A; however, FIG. 7 illustrates relative positions of the carriage 13 and the medium A, and the medium A actually moves in the transport direction (Y direction). In addition, for the convenience of the description, the nozzle 161A is illustrated to form only several dots; however, actually, since the ink droplets are intermittently ejected from the nozzle 161A moving in the X direction, many dots are aligned in the X direction. Dots are not formed in response to the image data in some cases.

In FIG. 7, the dots illustrated as black circles are dots formed in the latest pass, and the dots illustrated as white dots are dots formed in the previous passes.

In the interlace printing, whenever the medium A is transported in the Y direction by a certain transport amount F, the nozzles 161A perform recording of a raster line immediately on a raster line (upstream side in the medium A) recorded in the previous pass.

The transport amount F is changed depending on the resolution of an image that is printed on the medium A. In general, in a case where the printer 10 performs printing at a high speed, the transport amount F is also increased according to the printing speed. In addition, in a case where an image having high resolution is printed at a low speed, the transport amount F is reduced, compared to the high-speed printing. Here, the transport amount F used in a case where a region in the Y direction, which corresponds to a head length Lh (distance from the nozzle 161A at the end portion on the +Y side of the nozzle group M to the nozzle 161A at the end portion on the −Y side), is filled by the number N of the passes is F=Lh/n. The higher the resolution, the more the number N of the passes is increased.

Description of Banding

Here, the density irregularity (banding) that occurs in the interlace printing is described.

In the following description, a "unit region" represents a rectangular region that is virtually set on the medium A, and the size and the shape of the unit region is set depending on printing resolution. For example, in a case where the printing resolution is 720 dpi (X direction)×720 dpi (Y direction), the unit region becomes a square region having a size of about 35.28 μm×35.28 μm (≈1/720 inches×1/720 inches). In addition, in a case where the printing resolution is 360 dpi×720 dpi, the unit region becomes a rectangular region having a size of about 70.56 μm×35.28 μm (≈1/360 inches×1/720 inches). When the ink droplet is ideally ejected, the ink droplet lands at the central position of the unit region, then the ink droplet is spread on the medium such that a dot is formed in the unit region. Note that one pixel that configures image data corresponds to one unit region. In addition, since the pixels are associated with the unit regions, items of pixel data of the pixels are also associated with the unit regions.

In addition, in the following description, a "row region" means a region that is configured of a plurality of the unit regions aligned in the X direction. For example, in the case where the printing resolution is 720 dpi×720 dpi, the row region becomes a strip region having a width of 35.28 μm (≈1/720 inches) in the transport direction. When the ink droplets are ideally ejected in an intermittent manner from the nozzles 161A moving in the X direction, a raster line is formed in the row region. Note that a plurality of pixels aligned in the X direction are associated with the row region.

Figure 8A:
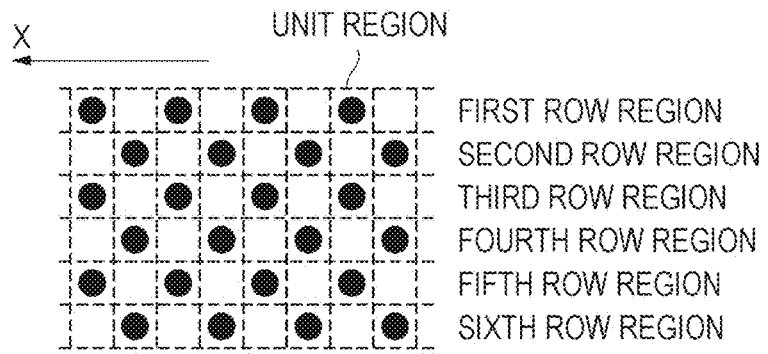
FIG. 8A is a view illustrating an example of dots formed in a case of ideal density.

FIG. 8A is a view illustrating an example of dots formed in a case of ideal density. In FIG. 8A, since dots are ideally formed, the dots are accurately formed in the unit regions, and the raster lines are accurately formed in the row regions. In FIG. 8A, the row region is illustrated as a region interposed between dotted lines, and, here, is a region having a width of 720 dpi. Image pieces having the density according to coloring of the region are formed in the row regions. Here, for simplification of the description, an image having uniform density in which a dot generation rate is 50% is printed.

Figure 8B:
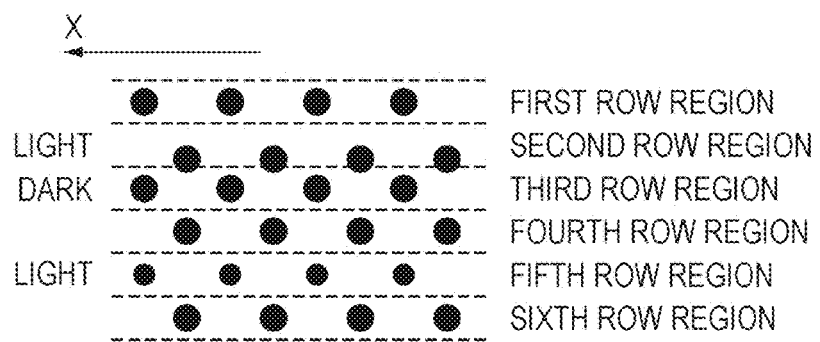
FIG. 8B is a view illustrating an example of dots formed in a case of an occurrence of density irregularity.

FIG. 8B is a view illustrating an example of dots formed in a case of an occurrence of density irregularity. Here, a raster line formed in a second row region is formed to be closer to a third row region side (upstream side in the transport direction) due to variations in a flight direction of ink droplets ejected from the nozzles 161A. In addition, an amount of ink droplets ejected toward a fifth row region is small, and thus dots formed in the fifth row region are small. In this case, the second row region and the fifth row region have density lower than preset density, and thus density irregularity referred to as a so-called "white streak" occurs. In addition, the third row region has density higher than the preset density, and thus density irregularity referred to as a so-called "black streak" occurs.

Figure 8C:
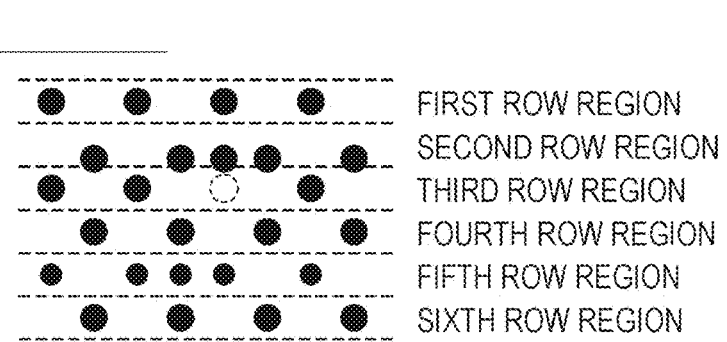
FIG. 8C is a view illustrating dots formed by correction through a printing method of the embodiment.

FIG. 8C is a view illustrating dots formed by correction through a printing method of the embodiment. In the embodiment, tone values of items of pixel data (items of color pixel data) of pixels corresponding to a row region are corrected such that light-color image pieces are formed in a row region, which is likely to be visually recognized to be dark. In addition, tone values of items of pixel data of pixels corresponding to a row region are corrected such that dark-color image pieces are formed in a row region, which is likely to be visually recognized as a light color. For example, the tone values of items of pixel data of pixels corresponding to each of the row regions are corrected such that the dot generation rate of the second row region in FIG. 8C is increased, and the dot generation rate of the third row region is decreased, and the dot generation rate of the fifth row region is increased. Thus, the dot generation rates of the raster lines of the row regions are changed and the density of the image pieces of the row region is corrected such that the density irregularity of the entire printing image is reduced.

Incidentally, in FIG. 8B, the density of the image pieces formed in the third row region becomes dark, which is not because of an influence of the nozzles that forms the raster line in the third row region, but because of an influence of the nozzles that forms a raster line in the adjacent second row region. Therefore, in a case where the nozzles, which form the raster line in the third row region, form a raster line in another row region, it is not possible to obtain dark image pieces formed in the row region. In other words, even the image pieces formed by the same nozzles 161A may have different density when the nozzles 161A that form an adjacent image pieces are different from each other. In this case, it is not possible to reduce the density irregularity simply with the correction values associated with the nozzles 161A. In the embodiment, the tone values of the print data are corrected, based on the correction values that are set for each region.

Therefore, in the embodiment, the correcting pattern 40 printed by the printing portion 16 is imaged by using the imaging device 17 mounted on the carriage 13, the correction value, to which characteristics of the density irregularity is reflected, is calculated, based on the imaging data, and is stored in the memory 153. Then, when the next printing process is performed, the correction value stored in the memory 153 is output to the arithmetic circuit 154, a circuit of the driver board 162 of the printing portion 16 corrects the tone values of the pixel data, based on the correction value, and print data is generated, based on the corrected tone value such that the printing is performed.

Correction Value Acquiring Method of Banding Correction

Next, a correction value acquiring method in the banding correction in the printer 10 of the embodiment will be described.

Figure 9:
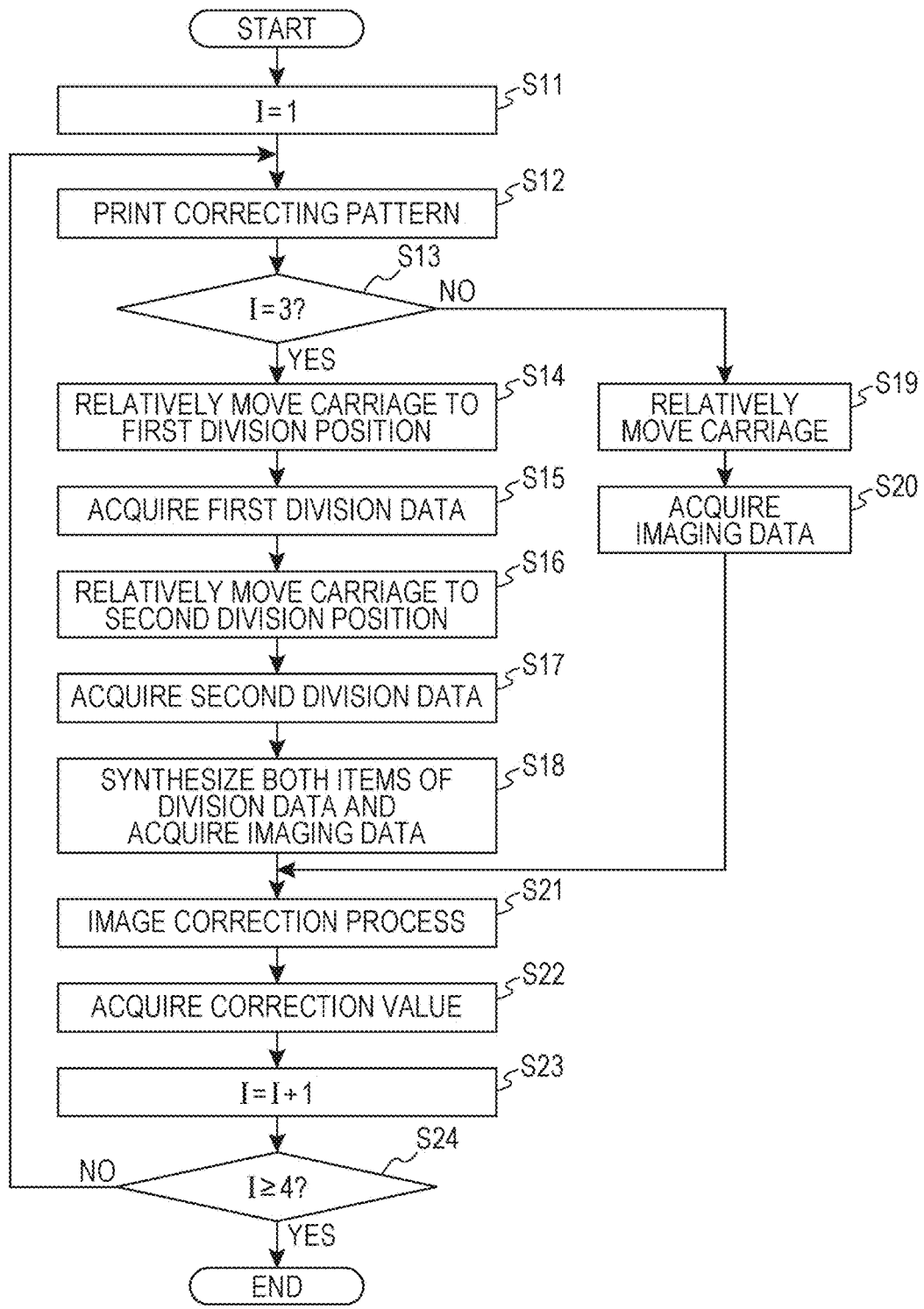
FIG. 9 is a flowchart illustrating a correction value acquiring method according to the embodiment.

FIG. 9 is a flowchart illustrating a correction value acquiring method.

In the printer 10 of the embodiment, for example, an input operation by a user or a correction value acquiring process of acquiring a correction value of the banding correction is performed for each predetermined cycle. In the correction value acquiring process, first, a pass variable I in the printing process is initialized (I=1) (Step S11). Here, the pass variable I is a variable determined depending on the resolution of an image which is to be printed, that is, a variable corresponding to the number N of the passes required to fill, with ink, a region having a length in the Y direction, which is equal to the head length. In the embodiment, the number N of the passes is 8 in a case where the pass variable I is 1, N=6 in a case where I=2, and N=4 in a case where I=3.

Next, the printing control unit 154B reads the correcting pattern 40 stored in the memory 153 and performs a process of printing on the medium A with the resolution according to the pass variable I (Step S12). Note that it is possible to perform the printing process of the correcting pattern 40 by the same processes from Step S2 to Step S5 described above.

Here, the correcting pattern 40, which is printed on the medium A in Step S11, is described with reference to the figures.

Figure 10:
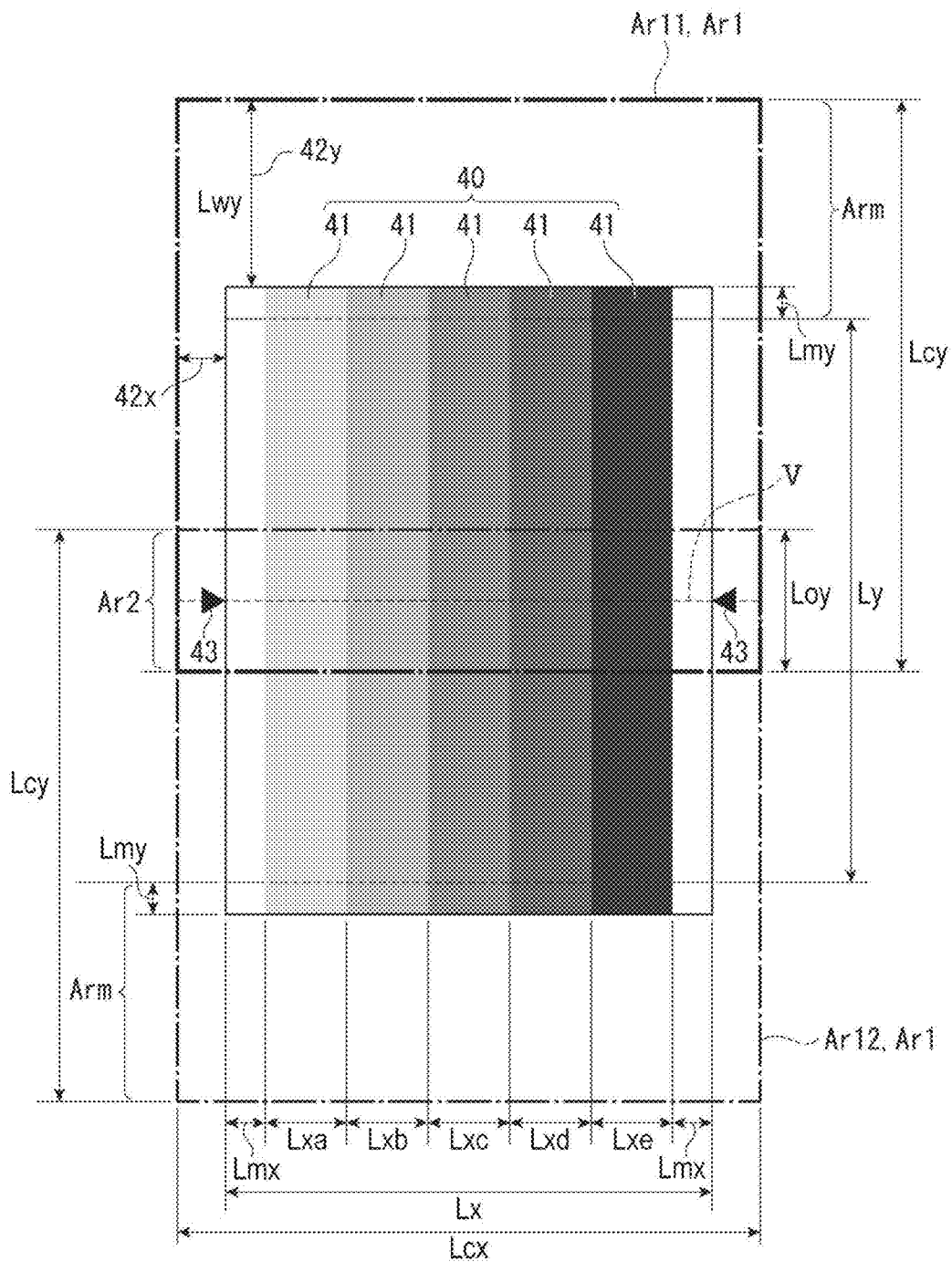
FIG. 10 is a view illustrating a schematic correcting pattern according to the embodiment.

FIG. 10 is a view illustrating a schematic example of the correcting pattern 40.

As illustrated in FIG. 10, the correcting pattern 40 is a pattern image having strip regions 41 (corresponding to a first pattern and a second pattern of the invention) that have a longitudinal direction in the Y direction and are aligned to be parallel to the X direction. The printing portion 16 performs the printing process such that pixels in one strip region 41 have the same density and adjacent strip regions 41 have density different from each other. For example, in an example in FIG. 10, the five strip regions 41 having density of 10%, 30%, 50%, 70%, and 90% are aligned in this order from the left (Full side) in the X direction. In addition, blank regions 42x and 42y are provided around the correcting pattern 40. Thus, a region boundary of the strip region 41 becomes clear, the boundary of the correcting pattern 40 is likely to be recognized even in the imaging data, and positional accuracy is improved.

The correcting patterns are formed with respect to the color inks, respectively. For example, in a case where nine nozzle units 161 corresponding to nine colors are provided, nine correcting patterns 40 are individually formed. Note that FIG. 10 illustrate an example in which five strip regions 41 are provided in one correcting pattern 40; however, more strip regions 41 may be provided or less (for example, three) strip regions 41 may be provided. In addition, in a case where the strip regions 41 are not fitted in one correcting pattern 40, a plurality of correcting patterns 40 may be provided. For example, the correcting pattern 40 having the three strip regions 41 having the density of 10%, 30%, and 50%, and the correcting pattern 40 having the three strip regions having the density of 50%, 70%, and 90% may be provided. In the case where the plurality of correcting patterns 40 are formed, it is preferable that the correcting patterns 40 are aligned in the X direction.

Here, a dimension Lx of the correcting pattern 40 in the X direction is determined by the width dimensions Lxa, Lxb, Lxc, Lxd, and Lxe and a margin Lmx of the strip regions in the X direction. In addition, a dimension (pattern length Ly) of the correcting pattern 40 in the Y direction is determined to be Ly=Lh/N by the head length Lh and the number N of the passes. Note that the head length is a distance between both end portions of the plurality of nozzles 161A aligned in the Y direction, that is, the dimension of the length of the nozzle group M. In other words, the pattern length Ly of the correcting pattern is set to the same value as the transport amount F. Note that, as illustrated in FIG. 10, the correcting pattern 40 may be formed in an extra space of only margins Lmy on the ±Y sides.

Figure 11A:
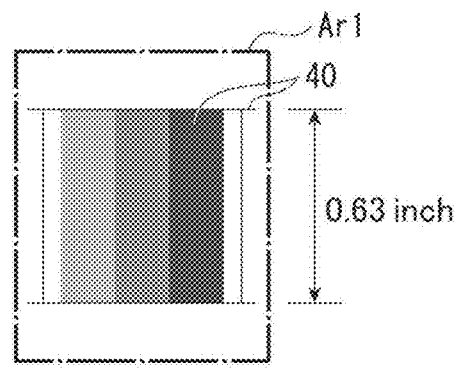
FIGS. 11A to 11C are views illustrating the correcting patterns according to levels of resolution according to the embodiment.
Figure 11B:
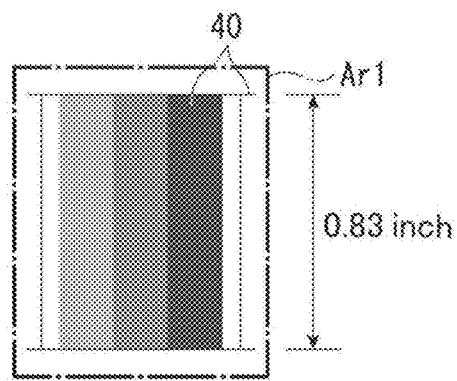
Figure 11C:
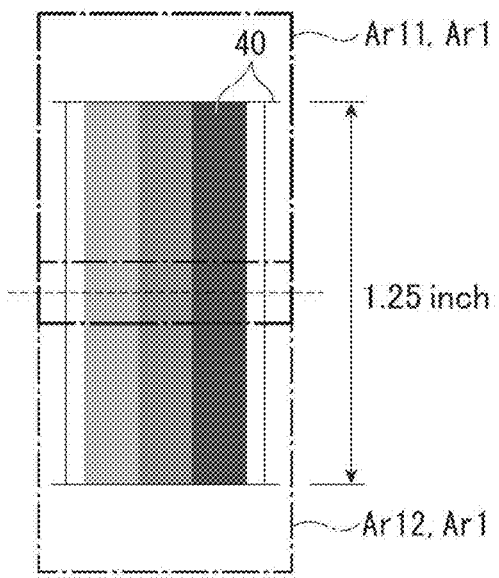

FIGS. 11A to 11C are views illustrating the correcting patterns 40 in a case where the head length is 5 inches. Note that FIGS. 11A to 11C illustrate examples of the correcting patterns 40 having three strip regions 41.

For example, in a case where the head length is 5 inches and the number of passes is eight times, as illustrated in FIG. 11A, the pattern length Ly is 0.625 (≈0.63) inches. In a case where the number of passes is six times, as illustrated in FIG. 11B, the pattern length Ly is 0.83 inches. In a case where the number of passes is four times, as illustrated in FIG. 11C, the pattern length Ly is 1.25 inches. In other words, the pattern length Ly is equal to the transport amount F.

Incidentally, as described above, the imaging region Ar1 in the embodiment has a rectangular shape of which a length dimension Lcx in the X direction is smaller than a length dimension Lcy in the Y direction, for example, a size of 0.8 inches (X direction)×1.0 inch (Y direction). As illustrated in FIGS. 11A and 11B, since the pattern length Ly is 0.625 inches in the case where the number N of the passes is 8 and the pattern length Ly is 0.83 inches in the case where the number N of the passes is 6, the correcting pattern 40 in any case is fitted in the imaging region Ar1. In the embodiment, since the imaging device 17 images the correcting pattern 40 and the correction value is calculated based on the imaging data, it is preferable that the correcting pattern 40 is fitted in the imaging region Ar1 of the imaging device 17.

Meanwhile, since the pattern length Ly is 1.25 inches in the case where the number N of the passes is 4, the correcting pattern is not fitted in the imaging region Ar1. In this case, as illustrated in FIGS. 10 and 11C, the imaging process is performed on the imaging region Ar1 by being divided into a plurality of times (for example, twice). At this time, it is preferable that in order to determine the imaging portion in each time of imaging, as illustrated in FIG. 10, a mark 43 for positioning is provided.

As illustrated in FIG. 10, the mark 43 may be provided in a region (overlap region) Ar2 formed by overlapping a first region Ar11 as an imaging region of the first imaging, and a second region Ar12 as an imaging region of the second imaging. Specifically, the mark 43 is provided, for example, at the central point in the Y direction in the vicinity of the outer circumferential edge of the correcting pattern 40, that is, on a virtual line V parallel to the Y direction, which bisects the correcting pattern 40 and the overlap region Ar2. In addition, it is preferable that two marks 43 are provided to interpose the correcting pattern 40 therebetween in the X direction. Note that the mark 43 may be provided in the overlap region of the imaging regions in continual times of imaging. In addition, in the embodiment, the correcting pattern 40 having a pair of marks 43 on the virtual line V that bisects the overlap region Ar2 is described; however, the correcting pattern may have one or three or more marks 43. For example, there may be employed a configuration in which two marks 43 are provided on the ±X sides of the correcting pattern 40 so as to interpose the virtual line V therebetween in the Y direction.

In addition, as illustrated in FIG. 10, blank regions 42x and 42y are provided around the correcting pattern 40 with respect to the first region Ar11 and the second region Ar12 (that is, the imaging region Ar1 in each time of imaging). Thus, the boundary of the correcting pattern 40 is easily recognized even in the imaging data, and positional accuracy is improved. In addition, a margin region Arm is formed to include the blank regions 42y provided on the ±Y sides of the correcting pattern 40 and regions provided in the extra space of only the margin Lmy on the ±Y sides of the correcting pattern 40. Thus, even in a case where a feeding amount of the medium A is larger or smaller than a predetermined amount, it is possible to reduce projecting of a part of the correcting pattern 40 from the imaging region Ar1.

Back in FIG. 9, when the correcting pattern 40 is formed by the printing portion 16 by Step S11, the imaging control unit 154C determines whether or not the pass variable I is "3" (Step S13).

In a case where it is determined to be YES in Step S13, the pass variable I is "3" and the number N of the passes is "4". In this case, since the size of the correcting pattern 40 is larger than the size of the imaging region Ar1, the imaging control unit 154C performs control such that the correcting pattern 40 is imaged by being divided twice by the imaging device 17. In other words, the scanning control unit 154A causes the medium A to be transported to the downstream side in the Y direction by a predetermined amount, causes the carriage 13 to move in the X direction, and the carriage 13 (imaging device 17) relatively moves such that an end side of the correcting pattern 40 on the +Y side and the mark 43 enter the imaging region Ar1 of the imaging device 17, that is, the first region Ar11 as the imaging region Ar1 in the first imaging (Step S14). The transport amount of the medium A in the Y direction at this time is calculated depending on a distance between the printing portion 16 and the imaging device 17 in the carriage 13 in the Y direction and the size of the correcting pattern 40 in the Y direction. In addition, an amount of the movement of the carriage 13 in the X direction is calculated depending on the position of the carriage 13 when the printing of the correcting pattern 40 by the printing portion 16 is ended, the distance between the printing portion 16 and the imaging device 17 in the carriage 13, and the size of the correcting pattern 40 in the X direction.

Then, the imaging control unit 154C acquires imaging data (first division data) at the corresponding position by the imaging device 17 that in a state of being stopped with respect to the medium A (Step S15).

Next, the scanning control unit 154A further causes the medium A to be transported in the +Y direction from the state in Step S15 (Step S16). Here, the transport amount of the medium A is set such that the mark 43 enters the imaging region Ar1 (that is, the first region Ar11 and the second region Ar12) in each time of imaging. For example, in the example illustrated in FIG. 10, when the dimension of the overlap region Ar2 in the Y direction is Loy, the transport amount is Lcy−Loy. In addition, when the dimension of the blank region 42y in the Y direction is Lwy, the transport amount is Ly−Lcy+2(Lwy+Lmy).

In other words, in Step S16, the carriage 13 is caused to relatively move with respect to the medium A such that the end side of the correcting pattern 40 on the −Y side and the mark 43 enter the second region Ar12 as the imaging region Ar1 in the second imaging. Then, the imaging control unit 154C acquires imaging data (second division data) at the corresponding position by the imaging device 17 that is in a state of being stopped with respect to the medium A (Step S17).

Figure 12:
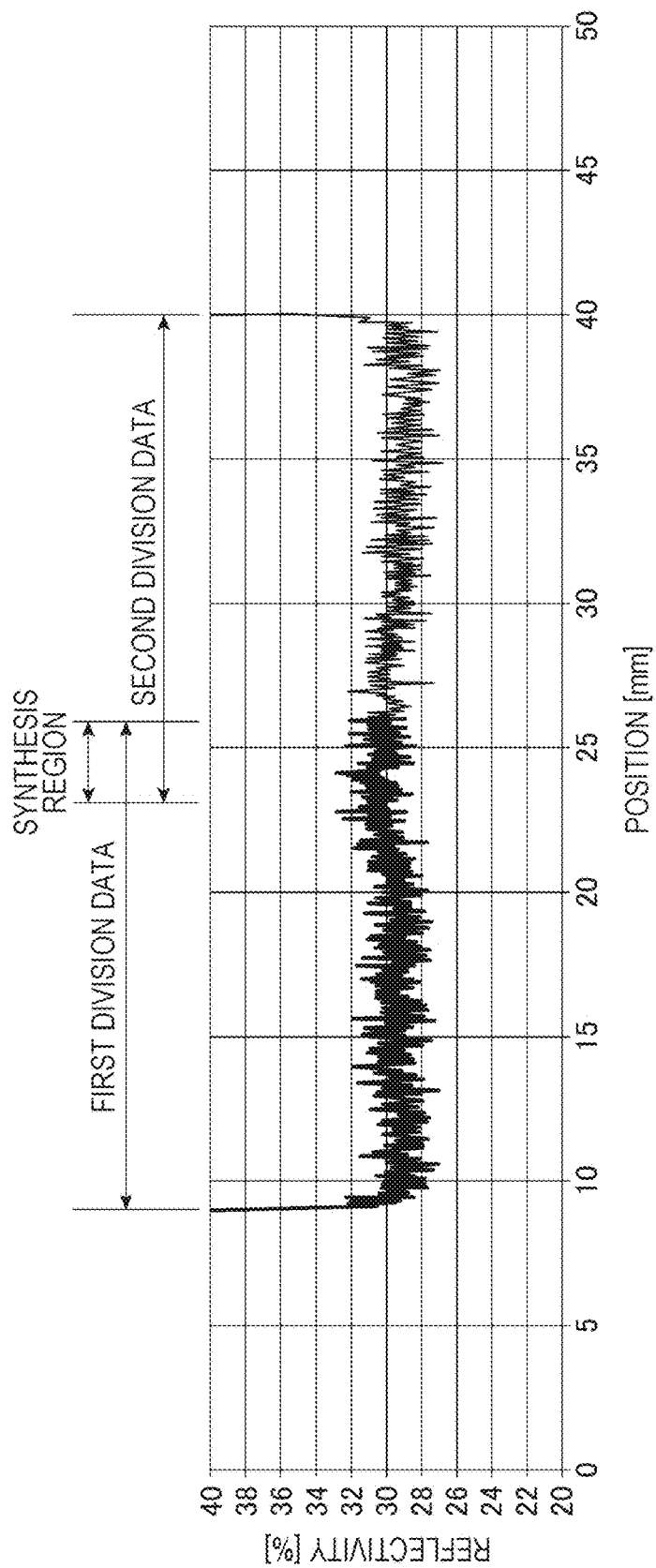
FIG. 12 is a diagram illustrating reflectivity in a Y direction in first division data and second division data according to the embodiment.

FIG. 12 is a diagram illustrating reflectivity in the Y direction in first division data and second division data according. Note that, in FIG. 12, the vertical axis represents reflectivity, and the reflectivity is a value corresponding to a tone value.

The first division data and the second division data acquired in Step S15 and Step S17 are both input to the control unit 15, and the imaging control unit 154C synthesizes the two items of data and obtains imaging data (Step S18).

The imaging control unit 154C detects the mark 43 in the first division data and the second division data, and the overlap region Ar2 (refer to FIG. 10) as a region having a predetermined dimension on the +Y side and on the −Y side from the mark 43 becomes a synthesis region. For example, the imaging control unit 154C calculates an average value of the tone value (pixel value) of a pixel corresponding to the first division data and the second division data in the synthesis region. In other words, the tone value acquired by the first pixel of the imaging device 17 in the first division data, and a pixel value acquired by the second pixel corresponding to a position of the first pixel of the imaging device 17 in the second division data are averaged. In the embodiment, the first pixel and the second pixel are pixels related to have substantially the same (preferably the same) position in the correcting pattern 40. Thus, the tone values of the pixels corresponding to the overlap region Ar2 in the imaging data are calculated as an average value of two tone values obtained by imaging substantially the same imaging position.

Note that, in the embodiment, an example, in which the average value of the tone values of the two items of data is used, is described; however, the embodiment is not limited thereto, and one of the first division data and the second division data may be selected and may be used as the tone value of the synthesis region.

Here, the dimension of the overlap region Ar2, that is, the synthesis region in the Y direction can be obtained by two times a value obtained by subtracting a dimension of the margin region Arm and a half of the dimension Ly of the correcting pattern 40 from the dimension of the imaging region Ar1. Here, when the dimension Lwy of the blank region 42y is set in the Y direction, the dimension of the margin region Arm is (Lmy+Lwy), and the dimension Loy of the overlap region Ar2 is Ly−Lcy+2(Lmy+Lwy).

By comparison, in a case where it is determined to be NO in Step S13, the pass variable I is not "3", the number N of the passes is "8" or "6", and the size of the correcting pattern 40 becomes smaller than the size of the imaging region Ar1. In this case, the scanning control unit 154A causes the medium A to be transported to the downstream side in the Y direction by a predetermined amount, and causes the carriage 13 to move in the X direction such that the correcting pattern 40 is included in the imaging region Ar1 (Step S19).

Similar to Step S14, the transport amount of the medium A in the Y direction at this time is calculated depending on the distance between the printing portion 16 and the imaging device 17 in the carriage 13 in the Y direction and the size of the correcting pattern 40 in the Y direction. In addition, an amount of the movement of the carriage 13 in the X direction is calculated depending on the position of the carriage 13 when the printing of the correcting pattern 40 by the printing portion 16 is ended, the distance between the printing portion 16 and the imaging device 17 in the carriage 13, and the size of the correcting pattern 40 in the X direction.

Then, the imaging control unit 154C acquires imaging data at the corresponding position by the imaging device 17 (Step S20).

When the imaging data is acquired in Step S18 and Step S20, the imaging control unit 154C performs an image correcting process on the acquired imaging data (Step S21).

In Step S21, a correction process of the illumination irregularity by the light source unit 175, a correction process of correcting rotation or distortion of the image by the lens unit 174A, or the like is performed.

Then, the correction value calculating unit 154D acquires the correction value, based on the imaging data (Step S22).

Figure 13A:
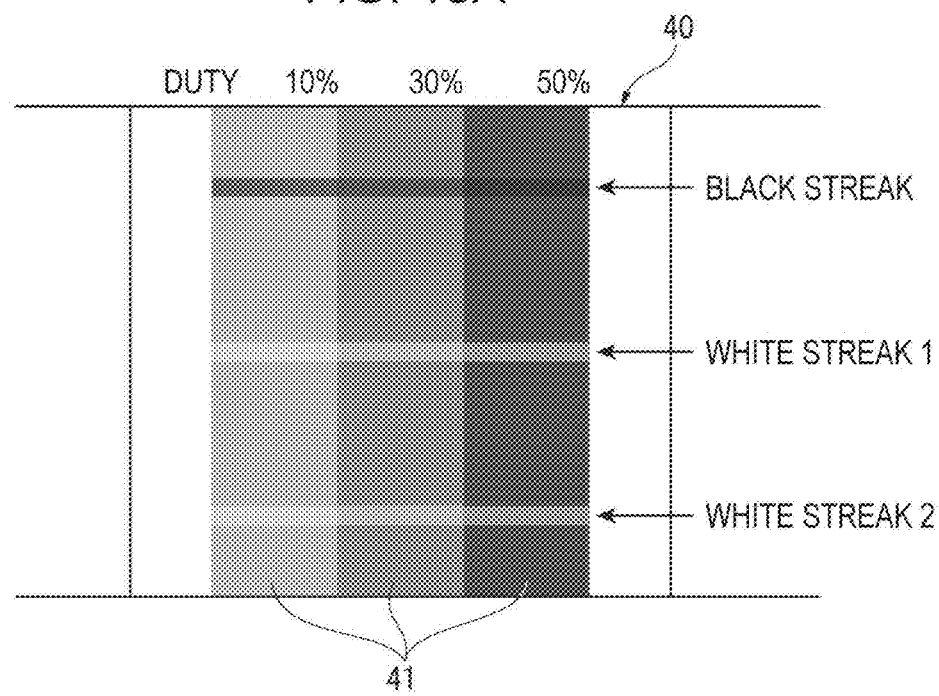
FIGS. 13A and 13B are diagrams illustrating imaging data of the correcting pattern obtained in a case where there is density irregularity and reading luminance (tone value) of a pixel line (strip region) in the Y direction in the imaging data.
Figure 13B:
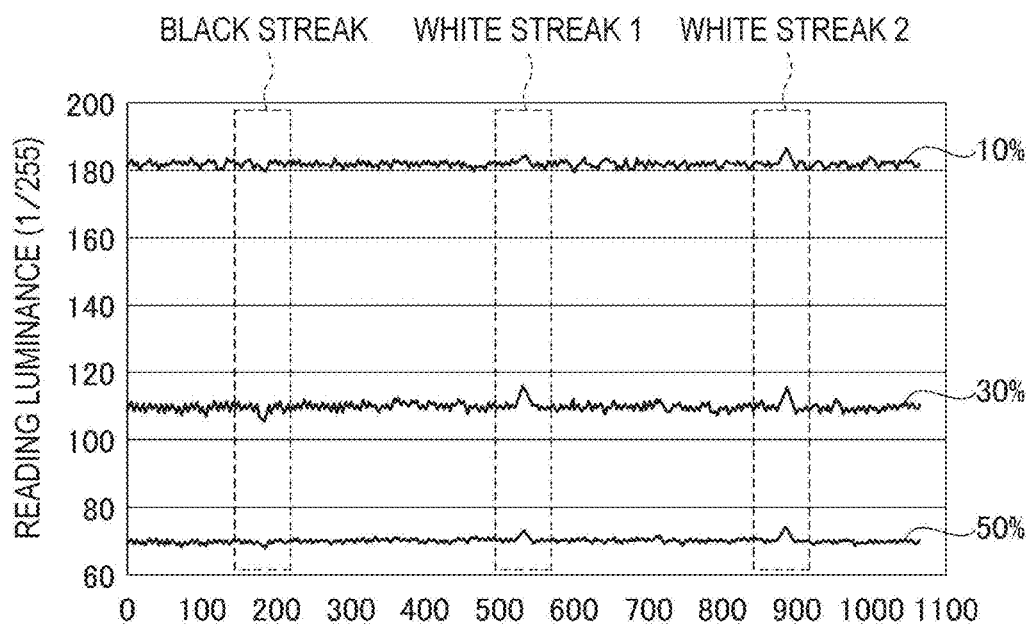
Figure 14A:
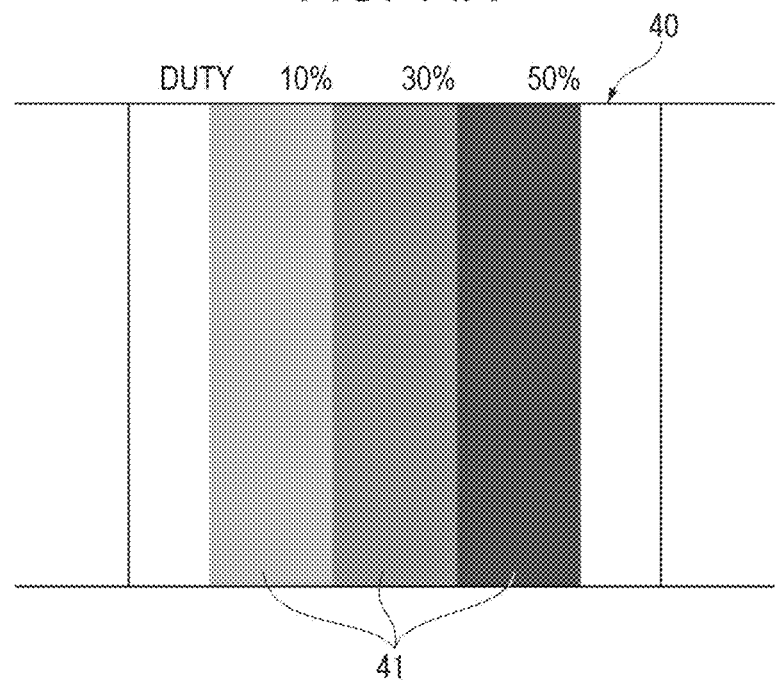
FIGS. 14A and 14B are diagrams illustrating imaging data of the correcting pattern corrected using a correction value and reading luminance of the pixel line in the Y direction in the imaging data, from FIGS. 13A and 13B.
Figure 14B:
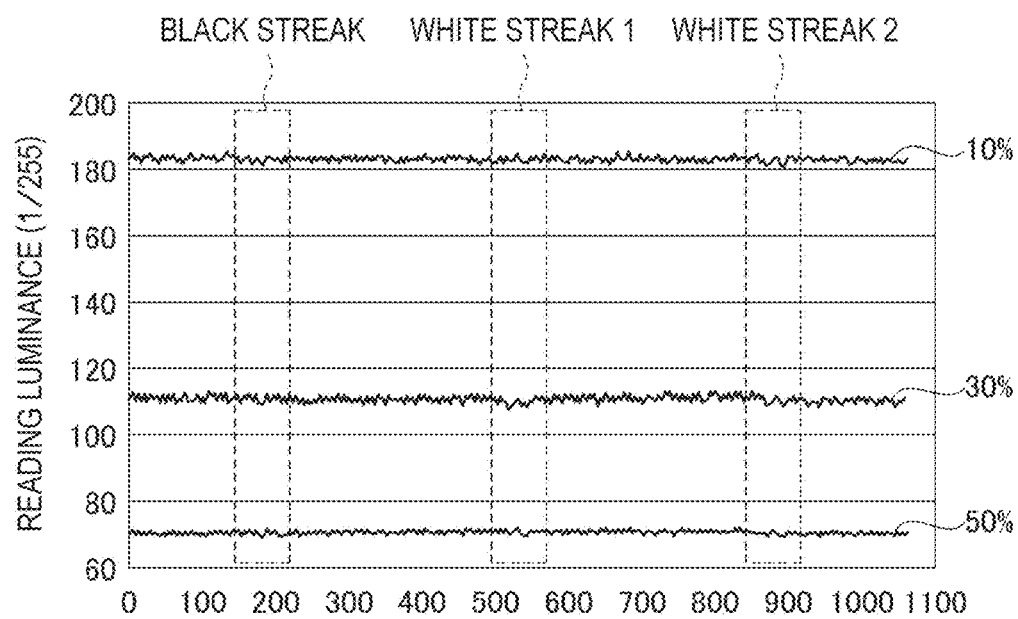

FIGS. 13A and 13B illustrate the imaging data of the correcting pattern 40 obtained in a case where the density irregularity (white streak and black streak) occurs and reading luminance (tone value) of a pixel line (strip region 41) in the Y direction in the imaging data. In addition, FIGS. 14A and 14B illustrate the imaging data of the correcting pattern 40 corrected using the correction value and reading luminance (tone value) of the pixel line in the Y direction in the imaging data. Note that the white streak and the black streak are described in FIG. 14B; however, the description illustrates positions of the white streak and the black streak occurring in FIGS. 13A and 13B, and as can be construed in the figures, the density irregularity is improved by the banding correction. In addition, FIGS. 13A to 14B illustrate a case of using the correcting pattern 40 having three strip regions 41.

In a case where the density irregularity as illustrated in FIG. 13A occurs, as illustrated in FIG. 13B, the tone value is lowered at a position (raster line) corresponding to the black streak and the tone value is increased at a position corresponding to the white streak. Thus, in the embodiment, the correction value is calculated based on the imaging data, and thereby the correction value is acquired such that the correcting pattern 40 as illustrated in FIGS. 14A and 14B is formed.

As a specific calculation method of the correction value, it is possible to use a known method as disclosed in JP-A-2006-305956. For example, a target command tone value Sbt is calculated using, with respect to the row region in the X direction, command tone values Sa (corresponding to the density of 10%), Sb (corresponding to the density of 30%), and Sc (corresponding to the density of 50%) with respect to each of the strip regions 41, and measured tone values Ca, Cb, and Cc obtained from the strip regions 41 of the imaging data. Also, a ratio of a difference between the target command tone value Sbt and the command tone value Sb to the command tone value Sb is calculated as the correction value Hb.

Note that FIGS. 10 to 11C illustrate examples in which the strip region 41 having three levels of density (target command value) is formed. In this case, in the method described above, the correction value Hb is obtained with respect to the density of 30%. In a case where correction values are acquired with respect to more levels of density, the correcting pattern 40 having more strip regions 41 having different levels of density may be formed. In addition, in a case where the plurality of strip regions 41 are not fitted in the imaging region Ar1, the plurality of correcting patterns 40 may be formed in the X direction, and the imaging data of the correcting patterns 40 may be acquired. The plurality of correcting patterns 40 are arranged in the X direction, and thereby only the movement of the carriage 13 in the X direction enables the imaging data of the correcting patterns 40 to be easily acquired.

The processes in Step S12 to Step S21 are performed with respect to each color that is supplied from the nozzle unit 161 and the correction value for each color is calculated.

In addition, in the embodiment, the printing portion 16 and the imaging device 17 are mounted on the same carriage 13. Accordingly, a positional relationship between the printing portion 16 and the imaging device 17 is represented by a known fixed value. Hence, the positional error is unlikely to occur, compared to a case in which the correcting pattern printed by the printing portion 16 is translocated to a separate scanner or the like.

In other words, in a case where the correcting pattern is translocated to the scanner, a positional shift, a rotational shift, or the like of the medium is produced when the medium, on which the correcting pattern is printed, is set to the scanner. In this case, an XY direction in the printer 10 is different from an XY direction in the scanned image obtained by the scanner and thus, it is not possible to acquire a change in the tone value with respect to an exact X direction. In addition, it is considered that the scanned image obtained by the scanner is appropriately corrected, and an XY position coordinate system of the scanned image is converted to the XY position coordinate system of the printer 10, or is corrected; however, a complicated arithmetic process needs to be performed. By comparison, in the embodiment, since the printing process of the correcting pattern and an imaging process of the correcting pattern are performed in the printer 10, the complicated arithmetic process described above, which is performed to acquire the correcting value does not need to be performed, and it is possible to easily acquire a highly accurate correction value having a small positional error.

Then, the control unit 15 adds 1 to the pass variable I (Step S23), and it is determined whether or not the pass variable I is 4 or greater (Step S24). In a case of being determined to be NO in Step S24, the flow returns to Step S12. In other words, the correcting pattern to be printed is changed to a pattern according to the number N of the passes, and the processes from Step S12 to Step S23 are performed.

By comparison, in a case of being determined to be YES in Step S24, the acquiring process of the correction value of the banding correction is ended.

Applying of Correction Value

The correction value described above is applied to the print data during the printing process by the printing portion 16.

In Step S1 in FIG. 6, the printing process on the medium A by the printer 10 is performed, based on the printing command contained in the print data acquired from the external device 20 or the like. The print data contains image data to be printed, for example, data may be received by a printer driver installed in the external device 20 such as the personal computer after a profile converting process, a color converting process, a halftone process, or the like is performed, or only image data as a printing target may be acquired from the external device 20 and the arithmetic circuit 154 may perform the processes.

In the embodiment, the image data is acquired from the external device 20 or the like, print data is generated by correcting the image data using the correction value calculated by the correction value calculating unit 154D, and the processes from Step S2 to Step S7 illustrated in FIG. 6 are performed based on the corresponding print data.

Hereinafter, a process of generating the print data from the image data acquired from the external device 20 or the like will be described.

Figure 15:
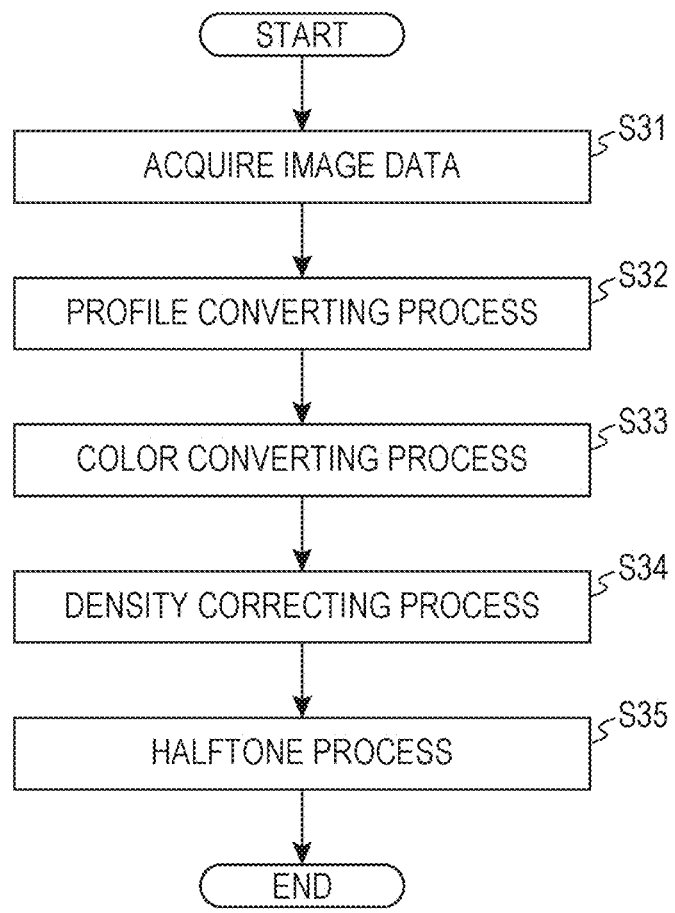
FIG. 15 is a flowchart illustrating a generation process of print data according to the embodiment.

FIG. 15 is a flowchart illustrating a generation process of print data.

When the printer 10 acquires the image data from the external device 20 or the like (Step S31), first, the printer performs the profile converting process with respect to the image data (Step S32).

In Step S32, the printing control unit 154B converts the acquired image data into the resolution used when the printing is performed on the medium A, based on a print profile stored in the memory 153. For example, in a case where an image having the resolution of 720×720 dpi is printed by the printer 10, the image data is converted to the resolution of 720×720 dpi. Note that the image data obtained after the profile converting process is RGB (red, green, and blue) data with 256 tones.

Then, the printing control unit 154B performs the color converting process (Step S33). In Step S33, the RGB data is converted into print color space data corresponding to an ink color used by the printer 10. For example, in a case where printing is performed using color inks of CMYK (cyan, magenta, yellow, and black) by the printer 10, the RGB data is converted into CMYK data with 256 tones that are represented by CMYK color spaces. The color converting process is performed, based on color converting LUT data in which the tone value of the RGB data is associated with a tone value of the print color space data used by the printer 10.

Then, the printing control unit 154B performs a density correcting process, based on the correction value calculated by the correction value acquiring process of the banding correction described above (Step S34).

The process in Step S34 is the same as the correction method disclosed in JP-A-2006-305956, and the correction values calculated with respect to the row regions are corrected by being applied to the tone values of the row regions corresponding to the print color space data obtained in Step S33. For example, when a tone value S_in of the print color space data is the same as the command tone value Sb used at the time of forming the correcting pattern with respect to any pixel, the tone value S_in (=Sb) of the print color space data is corrected to Sb×(1+Hb). In addition, in a case where the tone value S_in of the print color space data is different from the command tone value Sb used at the time of forming the correcting pattern, for example, the tone value S_in is corrected by linear interpolation or the like.

Then, the printing control unit 154B performs the halftone process (Step S35). The halftone process is a process of converting data having a high number of tones into print data having the number of tones which can be formed by the printing portion 16. For example, data having 256 tones is converted into 1-bit data having 2 tones or 2-bit data having four tones by the halftone process. In the halftone process, pixel data is generated such that it is possible for the printing portion 16 to disperse and to form the dots, using a dithering method, a γ correction, an error diffusion method, or the like.

Here, the halftone process in Step S35 is performed after the density correcting method in Step S34. Therefore, since the tone value of the pixel data of the row region is corrected to be lowered in the row region which is visually recognized to be dark, the dot generation rate of the dots that configure the raster line of the row region is lowered. Conversely, the dot generation rate is increased in the row region which is likely to be visually recognized to have a light color.

The printing control unit 154B performs the printing process illustrated in FIG. 6, based on the print data generated by the process described above. Thus, the dot generation rate of the raster line in each of the row region is changed and the density of the image pieces of the row region is corrected, and thereby the density irregularity of the entire printing image is reduced.

Operational Effect of Embodiment

The printer 10 of the embodiment includes the imaging device 17 provided to be capable of relatively moving with respect to the medium A. Then, the printer 10 images the correcting pattern 40 printed on the medium A by the imaging device 17 so as to be used to perform the banding correction, calculates the correction value that is used to perform the banding correction, based on the imaging data, and performs the banding correction.

In this configuration, it is possible to reduce an occurrence of the positional error, and thus it is possible to perform the banding correction with high accuracy, compared to a case where the correcting pattern 40 printed by the printer 10 is read by a separately prepared scanner or the like. In other words, in a case where the correcting pattern printed by the printer 10 is translocated to the scanner, distortion, a positional shift, rotating, or the like of the paper surface occurs in some cases when the pattern is set in the scanner. In this case, the XY direction in the image read by the scanner is different from the XY direction used when printing is performed by the printing portion 16, and thus a positional error is likely to occur. In addition, in a case where an arithmetic process that corrects the positional error is performed, the processes are complicated and it also takes a long time to perform the banding correction. By comparison, in the embodiment, as described above, it is possible to perform the banding correction with high accuracy, by which the occurrence of the positional error is reduced. In addition, it is possible to rapidly perform the banding correction without wasting time and effort to translocate, to the scanner, the medium A on which the correcting pattern is printed. Further, in the case of using the scanner, since the image is read through line scanning, it takes time to scan the entire region. By comparison, in the embodiment, the imaging region Ar1 is imaged at a time using the imaging element 173A configured of the RGB image sensor. Thus, in this respect, it takes a short time to acquire the correction value for the banding correction, compared to a case of using the scanner.

In the printer 10 of the embodiment, after the first region Ar11 of the correcting pattern 40 is imaged and the first division data is acquired, the imaging device 17 and the medium A relatively move with respect to each other, the second region Ar12 of the correcting pattern 40 is imaged, and the second division data is acquired. The first division data and the second division data are synthesized so as to generate imaging data, and correction of the density irregularity is performed based on the imaging data. Thus, even in a case where the correcting pattern 40 is not fitted in the imaging region Ar1 of an imaging portion, a plurality of items of division data are acquired so as to acquire imaging data, and thereby it is possible to correct the density irregularity.

In addition, the imaging device 17 and the medium A, on which the correcting pattern 40 is printed, relatively move with respect to each other, and thereby it is possible to change the position of the imaging region Ar1 in the correcting pattern 40 with the medium A set in the printer 10. Hence, it is possible to reduce an occurrence of a positional shift (for example, a positional shift in the X direction) of the imaging region Ar1 and it is possible to easily perform the synthesis of the first division data and the second division data, compared to a case where the medium is reset in an imaging range of a scanner and the imaging region of the correcting pattern 40 is changed. In addition, it is possible to acquire the imaging data with high accuracy, and thus it is possible to perform the correction of the density irregularity with high accuracy.

In addition, since the first region Ar11 and the second region Ar12 overlap each other in the overlap region Ar2, the first division data and the second division data as the imaging data of the regions are also data obtained to contain a region (synthesis region) corresponding to the overlap region Ar2. In this case, when the first division data and the second division data are synthesized in a synthesizing process, it is possible to generate the imaging data corresponding to the entire region of the correcting pattern with accuracy. In other words, in a case where the overlap region Ar2 is not provided in the first region Ar11 and the second region Ar12, an edge of the first region Ar11 and an edge of the second region Ar12 need to be adjacent, in order to acquire the imaging data of the entire region of the correcting pattern. In this case, only a slight occurrence of an error in the imaging position results in a gap between the first region Ar11 and the second region Ar12. By comparison, as described in the embodiment, the overlap region Ar2 is provided in the first region Ar11 and the second region Ar12, and thereby it is possible to acquire imaging data corresponding to the entire region of the correcting pattern even in a case where the imaging position is shifted, when an amount of the shift is within a width of the overlap region Ar2.

In addition, when the first division data and the second division data are synthesized so as to generate the imaging data, the tone value of the first pixel of the imaging device 17 of the first division data and the tone value of the second pixel corresponding to the position of the first pixel of the second division data are averaged. In other words, the tone values of the pixels corresponding to the overlap region Ar2 in the imaging data is calculated as an average value of the two tone values obtained by imaging substantially the same imaging positions. Thus, it is possible to reduce an influence of a noise on the imaging data, and thus it is possible to correct the density irregularity with higher accuracy.

Here, the correcting pattern 40 has the positioning mark 43 in the overlap region Ar2 of the first region Ar11 and the second region Ar12. Hence, it is possible to easily perform positioning of the first division data and the second division data with high accuracy, using the positioning mark 43, and thus it is possible to easily acquire the imaging data with higher accuracy.

In addition, when the correcting pattern 40 is imaged and the imaging data is acquired, the drive of the supply unit 11, the transport unit 12, and the carriage moving unit 14 which correspond to the moving mechanism is stopped and the medium A and the imaging device 17 are immobilized. Here, in a case where the moving mechanism is driven such that the imaging data is acquired while the imaging device 17 moves with respect to the medium A, there is a concern that it is not possible to acquire the imaging data with high accuracy, due to vibration by the drive of the moving mechanism and a change in the distance between the imaging device 17 and the medium A. By comparison, in the embodiment, since the imaging data is acquired in a state in which the medium A and the imaging device 17 are immobilized, it is possible to reduce degradation in the quality of the imaging data due to the drive of the moving mechanism as described above, and it is possible to acquire the imaging data with high accuracy.

The printer 10 of the embodiment includes the control unit 15, and the control unit 15 calculates the correction value that is used to perform the banding correction, based on the imaging data of the correcting pattern 40 imaged by the imaging device 17, corrects the tone value of the image data based on the correction value, and corrects the print data that is used to perform the printing by the printing portion 16, based on the corrected image data.

In this configuration, the imaging data imaged by the imaging device 17 mounted in the printer 10 does not need to be transmitted to a personal computer or the like that calculates the correction value, and it is possible to perform calculation of the correction value and the banding correction only in the printer 10. Hence, the simplification of the configuration of the system is achieved. In addition, since printing data is generated using the image data subjected to the correction of the density irregularity based on the imaging data, it is possible to print an image with a high quality, of which the occurrence of the density irregularity is reduce.

In the printer 10 of the embodiment, the printing portion 16 and the imaging device 17 are mounted on the carriage 13. Therefore, the correcting pattern 40 is printed to the medium A by the printing portion 16, and it is possible to image the printed correcting pattern by the imaging device 17. In addition, the imaging device 17 and the printing portion 16 are mounted on the same carriage 13, and thereby it is possible to reduce the distance of the movement of the carriage 13 and the amount of feeding of the medium A when the imaging device 17 moves over the printed correcting pattern after the correcting pattern is printed by the printing portion 16. Thus, it is possible to reduce an occurrence of the positional error and it is possible to rapidly perform the process of acquiring the correction value of the banding correction.

In the embodiment, the printing portion 16 has the plurality of nozzles 161A aligned in the Y direction, performs alternately the first process of printing on the medium while the carriage 13 moves in the X direction, and the second process of moving of the printing position in the Y direction, and forms an image. At this time, the printing portion forms, as the correcting pattern 40, a pattern having the density that varies in the X direction, and the same density in the Y direction.

In the printer 10, in a case of forming an image having uniform density in a predetermined region, the first process and the second process are performed a plurality of times, and the region is filled with the dots. At this time, when the carriage 13, which relatively moves in the Y direction by the second process, performs the printing at a high speed, it is possible to shorten the time taken for printing; however, accuracy of the dot forming position is degraded, and the density irregularity is likely to occur.

In the embodiment, the correcting pattern 40 having the same density in the Y direction is formed to correct the density irregularity, the imaging data of the correcting pattern 40 is analyzed, and thereby it is possible to easily detect the density irregularity. In addition, the density of the correcting pattern 40 varies in the X direction. Accordingly, it is possible to detect whether or not there is density irregularity with respect to various levels of density.

In addition, as described above, even in a case where the dimension of the correcting pattern 40 is larger than the dimension of the imaging region Ar1 in the Y direction, a plurality of items of division data are acquired so as to acquire the imaging data, and thereby it is possible to correct the density irregularity. In other words, regardless of the dimension of the correcting pattern 40 in the Y direction, it is possible to easily detect the density irregularity in the Y direction with high accuracy, and it is possible to perform the banding correction.

In the embodiment, the imaging device 17 is provided on the +Y side further than the printing portion 16 in the carriage 13. In a common printer, when the transport unit 12 transports the medium A to the +Y side, it is possible to transport the medium A by a highly accurate transport amount. However, in a case of transporting to the −Y side, there is a concern that distortion or twist will occur in the medium A, and thus it is difficult to control the transport amount with accuracy. Accordingly, when the imaging device 17 is provided on the −Y side further than the printing portion 16 in the printer 10, the transport amount is not controlled with sufficient accuracy. Thus, there is a concern that the correcting pattern 40 will be shifted from the imaging region Ar1, and thus the accuracy of the correction value is degraded due to the positional error. By comparison, in the embodiment, since the imaging device 17 is provided on the +Y side of the printing portion 16, it is possible to transport the medium A by the highly accurate transport amount, and thus it is possible to calculate a highly accurate correction value. In addition, the printer 10 alternately performs the dot forming process and the transport process of transporting the medium A to the +Y side in the printing process by the printing portion 16. Hence, in the configuration of the embodiment, it is possible to immediately perform the imaging process, by the imaging device 17, of the correcting pattern printed by the printing portion 16 and transported to the +Y side, and it is possible to reduce an occurrence of the positional error.

In the embodiment, as the correcting pattern 40, a pattern, which has strip regions 41, each of which is formed in uniform density and has the longitudinal side in the Y direction and the strip regions 41 having density different from each other are arranged in the X direction, is used.

In the printer 10 of the embodiment, the interlace type of printing process is performed, in this case, the density irregularity called the white streak or the black streak occurs in the X direction. By comparison, when the correcting pattern 40 described above is formed and the imaging data is analyzed, it is possible to easily detect whether or not there is density irregularity (white streak or black streak), and it is possible to detect a position of the density irregularity with high accuracy.

In addition, in the embodiment, in order to detect streaky density irregularity (white streak or black streak) in the X direction, the correcting pattern 40 having the strip regions 41, which have the longitudinal direction in the Y direction as described above and are aligned in the X direction, is used. Hence, the imaging region Ar1, which is imaged by the imaging device 17, has a shape with the longitudinal direction in the Y direction, and thereby it is possible to efficiently acquire the correcting pattern by imaging the pattern a reduced number of times.

Modification Example

Note that the invention is not limited to the embodiment described above and alteration, modification, or the like performed within a range, in which the advantage of the invention is achieved, is included in the invention.

For example, in the embodiment described above, the example, in which the imaging device 17 is, together with the printing portion 16, mounted on the carriage 13, is described; however, the invention is not limited thereto.

In other words, the printer may include a carriage for imaging, on which the imaging device 17 is mounted, separately from a carriage for printing, in which the printing portion 16 is provided. The carriage for imaging may be configured to be capable of moving by a moving mechanism having the same configuration as the carriage moving unit 14 of the embodiment described above. In this configuration, there are separately provided a first-direction moving unit that causes the carriage for printing to relatively move with respect to the medium in the X direction and a second-direction moving unit that causes the carriage for printing to relatively move with respect to the medium in the Y direction.

In this case, the carriage for imaging, on which the imaging device 17 is mounted, may be configured to be detachable from the printer. In other words, a common printer is provided with the carriage for imaging, on which the imaging device 17 is mounted, and a unit that causes the carriage for imaging to relatively move with respect to the medium. Also, a program (program that causes the control unit 15 in the embodiment described above to function as the scanning control unit 154A, the printing control unit 154B, the imaging control unit 154C, and the correction value calculating unit 154D) that is used to perform the banding correction is installed in the printer. Thus, similar to the embodiment, the common printer can function as a printer that is capable of performing the banding correction with high accuracy.

Further, in the embodiment, the carriage 13 may be configured to be detachable from the carriage moving unit 14. In the carriage 13, instead of a print head (carriage provided with only a printing portion), the carriage 13 of the embodiment described above is mounted in the common printer. In addition, as described above, the program that is used to perform the banding correction is installed in the printer. Thus, similar to the embodiment, it is possible to achieve a printer that is capable of performing the banding correction with high accuracy.

In the embodiment described above, the example, in which the correction value is calculated in the control unit 15 based on the imaging data acquired by the imaging device 17, is described; however, the invention is not limited thereto. For example, the imaging data is transmitted to the external device 20 (for example, a personal computer) and the correction value may be calculated in the external device 20. In this case, print data, to which the correction value is applied, may be generated in the external device 20 and may be transmitted to the printer 10. In addition, the printer 10 may acquire the correction value calculated in the external device 20, the correction value may be stored in the memory 153, and the print data that is used to perform the banding correction may be generated (by applying the correction value to the image data) in the printer 10. In this configuration, the configuration and the process of the printer 10 can be simplified. In addition, even in this case, since the imaging device 17 mounted in the printer 10 images the correcting pattern printed by the printing portion 16 of the printer 10, it is possible to rapidly acquire the correction value with high accuracy.

In the embodiment described above, in Step S11, after the printing portion 16 prints the correcting pattern 40, the imaging device 17 images the correcting pattern 40; however, the invention is not limited thereto.

For example, in the case where the number N of the passes is "4", the pattern length Ly is 1.25 inches, and then the length is longer than a distance dimension of the printing portion 16 and the imaging device 17 in the Y direction in some cases. In this case, before the printing portion 16 completes the printing of the correcting pattern 40, the imaging device 17 performs the imaging process. In this case, as illustrated in FIG. 10, it is preferable that the mark 43 is added to the correcting pattern 40. After the imaging process is ended, the printing portion 16 restarts the printing process and prints remaining correcting pattern 40. Note that the same is true of the remaining correcting pattern 40, and the same process may be performed in a case where the length of the remaining correcting pattern 40 is longer than the distance dimension of the printing portion 16 and the imaging device 17 in the Y direction. The processes described above enables the correcting pattern 40 to be imaged without returning of the medium A to the −Y side.

In addition, the medium A is transported in the Y direction by the supply unit 11 and the transport unit 12, and thereby the carriage 13 is subjected to the relative movement with respect to the medium A in the Y direction; however, the invention is not limited thereto.

For example, the carriage 13 may be configured to be capable of moving in the Y direction. In addition, the carriage 13 may be configured to be capable of moving in both of the X and Y directions.

Further, the carriage moving unit 14 causes the carriage 13 to move in the X direction; however, there may be employed a configuration in which the medium A moves in the X direction.

In the embodiment described above, the case where the first region Ar11 and the second region Ar12 are set to have the overlap region Ar2 is described as an example; however, the edge of the first region Ar11 on the +Y side may be set to be in contact with the edge of the second region Ar12 on the −Y side. In this case, the average value of the two items of the imaging data may be employed in the edge portions in which the two regions Ar11 and Ar12 are in contact with each other, or one item of the imaging data may be employed.

In addition, the first region Ar11 and the second region Ar12 do not have the overlap region Ar2, and, for example, the two regions may be set to be separated from each other in the Y direction. In this case, a region (non-imaging region), which is not imaged, is formed between the first region Ar11 and the second region Ar12 in the Y direction. Therefore, the first division data and the second division data are synthesized so as to interpose a pixel corresponding to the non-imaging region, and thereby it is possible to acquire the imaging data corresponding to the correcting pattern 40. In this configuration, although it is not possible to acquire the correction value in the non-imaging region, it is possible to acquire the correction value in a region other than the non-imaging region, and it is possible to achieve reduction of a data amount of the imaging data.

Note that, in the case where the first region Ar11 and the second region Ar12 are separated from each other as described above, it is preferable that a positioning mark is provided in each of the regions corresponding to the first region Ar11 and the second region Ar12 of the correcting pattern 40. Thus, it is possible to improve positioning accuracy at the time of synthesis of the first division data and the second division data.

In the embodiment described above, the configuration, in which the correcting pattern 40 is divided and imaged twice in the case where the number of passes is 4, and the first division data and the second division data are acquired, is described; however, the invention is not limited thereto. For example, in a case where the dimension of the correcting pattern 40 is larger than twice the dimension of the imaging region Ar1 in the Y direction, the correcting pattern 40 is divided and imaged three times, three items of division data are acquired, and thereby it is possible to acquire the imaging data of the entire correcting pattern 40. In this manner, the plurality of items of division data are acquired according to the dimension of the correcting pattern 40 in the Y direction and the dimension of the imaging region Ar1, and thereby it is possible to acquire the imaging data of the entire correcting pattern 40. At this time, the position of the imaging region in each time of imaging is set such that an overlap region is formed in the imaging regions by being continually imaged twice. In addition, it is preferable that the correcting pattern 40 has positioning marks in the overlap regions, respectively. Thus, regardless of the dimension of the correcting pattern 40 in the Y direction, it is possible to acquire the imaging data with high accuracy.

In the embodiment described above, the example, in which, in the case where the correcting pattern 40 is divided and is imaged a plurality of times, the imaging data is acquired by synthesizing the first division data and the second division data in Step S18, and then the image correcting process in Step S20 is performed, is described; however, the invention is not limited thereto.

For example, first, the same image correcting process as that in Step S21 may be performed on the first division data acquired in Step S15 and on the second division data acquired in Step S17, and the first division data and the second division data which are subjected to the image correction may be synthesized.

In the embodiment described above, when the correction value is calculated from the imaging data of the correcting pattern, the correction value is calculated for each row region based on the tone value of the row region in the X direction; however, the invention is not limited thereto. For example, a row region (nozzles 161A), in which the density irregularity occurs, may be detected from a change in the tone value in the Y direction and the correction value may be calculated.

Besides, a specific structure configured when the invention is embodied can be appropriately modified into another structure or the like within a range in which an advantage of the invention can be achieved.

The entire disclosure of Japanese Patent Application No. 2015-172699, filed Sep. 2, 2015 is expressly incorporated by reference herein.

What is claimed is:

1. A method for correcting density irregularity comprising:
acquiring imaging data by imaging, using an imaging device mounted in a printing apparatus, a correcting pattern for correcting density irregularity, which contains a first pattern with first density and a second pattern with second density different from the first density; and
correcting the density irregularity based on the imaging data,
wherein the acquiring of the imaging data includes
acquiring first division data by imaging a first region of the correcting pattern with the imaging device in a first stopped position relative to the correcting pattern,
acquiring second division data by imaging a second region of the correcting pattern with the imaging device in a second stopped position relative to the correcting pattern, and
synthesizing the first division data and the second division data to acquire the imaging data.

2. The method for correcting density irregularity according to claim 1,
wherein the correcting pattern has an overlap region in which a part of the first region overlaps a part of the second region.

3. The method for correcting density irregularity according to claim 2,
wherein, in the synthesizing, a pixel value of a first pixel of the imaging device in the first division data and a pixel value of a second pixel corresponding to a position of the first pixel of the imaging device in the second division data in the overlap region are averaged.

4. The method for correcting density irregularity according to claim 2,
wherein, in the acquiring of the first division data, the first region including a mark provided in a part of the overlap region is imaged, and
wherein, in the acquiring of the second division data, the second region including the mark is imaged.

5. The method for correcting density irregularity according to claim 1, further comprising:
causing the imaging device to relatively move with respect to the correcting pattern to a position at which the correcting pattern enters an imaging region by the imaging device; and
stopping the relative movement of the imaging device with respect to the correcting pattern before the acquiring of the imaging data.

6. The method for correcting density irregularity according to claim 1,
wherein the correcting includes calculating a correction value that is used to correct the density irregularity, based on the imaging data.

7. The method for correcting density irregularity according to claim 6,
wherein the correcting includes correcting an image by correcting a tone value of image data based on the correction value.

8. The method for correcting density irregularity according to claim 7, further comprising:
printing an image on a medium, based on the image data of which the tone value is corrected based on the correction value.

9. A printing apparatus comprising:
an imaging device having an opening window to which light from a medium is incident,
wherein the imaging device images a correcting pattern that is used to correct density irregularity, which contains a first pattern with first density and a second pattern with second density different from the first density, so as to acquire imaging data, and corrects the density irregularity based on the imaging data,
wherein, to acquire the imaging data, the imagine device is configured to
acquire first division data by imaging a first region of the correcting pattern with the imaging device in a first stopped position relative to the correcting pattern,
acquire second division data by imaging a second region of the correcting pattern with the imaging device in the second stopped position relative to the correcting pattern, and
synthesize the first division data and the second division data to acquire the imaging data.

10. The printing apparatus according to claim 9, further comprising:
a carriage that is provided with the imaging device and a printing portion which prints an image on a medium, and that is capable of relatively moving with respect to the medium;
a first moving mechanism that causes the carriage to relatively move with respect to the medium in a first direction; and
a second moving mechanism that causes the carriage to relatively move with respect to the medium in a second direction intersecting with the first direction,
wherein the imaging device images the first region of the correcting pattern sent in the second direction by the second moving mechanism so as to acquire the first division data, and images the second region of the correcting pattern further sent in the second direction by the second moving mechanism from an imaging position of the first region so as to acquire the second division data.

11. The printing apparatus according to claim 10,
wherein the printing portion has a plurality of ink ejecting ports arranged in the second direction, and wherein the printing apparatus causes the carriage to relatively move with respect to the medium in the first direction, alternately performs a first process of causing ink to be ejected from the printing portion and a second process of causing the carriage to relatively move with respect to the medium in the second direction, and prints a plurality of the correcting patterns which are disposed in the first direction and which extend in the second direction.

12. An imaging module that is capable of being mounted on a carriage of a printing apparatus that prints an image on a medium, the imaging module comprising:
an imaging device that has an opening window to which light from the medium is incident and that images a correcting pattern which is used to correct density irregularity in imaging data and contains a first pattern with first density and a second pattern with second density different from the first density,
wherein, to acquire the imaging data, the imagine device is configured to
acquire first division data by imaging a first region of the correcting pattern with the imaging device in a first stopped position relative to the correcting pattern,
acquire second division data by imaging a second region of the correcting pattern with the imaging device in the second stopped position relative to the correcting pattern, and
synthesize the first division data and the second division data to acquire the imaging data.

* * * * *